United States Patent
Yamazaki et al.

(10) Patent No.: US 8,731,688 B2
(45) Date of Patent: May 20, 2014

(54) PROCESSING APPARATUS AND METHOD FOR ACQUIRING LOG INFORMATION

(75) Inventors: Iwao Yamazaki, Kawasaki (JP); Michiharu Hara, Kawasaki (JP); Eiji Yamanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 868 days.

(21) Appl. No.: 12/726,121

(22) Filed: Mar. 17, 2010

(65) Prior Publication Data

US 2010/0242025 A1 Sep. 23, 2010

(30) Foreign Application Priority Data

Mar. 18, 2009 (JP) .................................. 2009-65959

(51) Int. Cl.
| | | |
|---|---|---|
| *G05B 11/01* | (2006.01) | |
| *G06F 9/44* | (2006.01) | |
| *G06F 12/00* | (2006.01) | |
| *G06F 11/00* | (2006.01) | |
| *G05B 19/042* | (2006.01) | |
| *G06F 11/34* | (2006.01) | |

(52) U.S. Cl.
CPC .......... *G05B 19/042* (2013.01); *G06F 11/3476* (2013.01); *G06F 11/3466* (2013.01); *G06F 2201/885* (2013.01)
USPC ................. 700/17; 700/11; 717/127; 714/47; 711/125; 711/E12.001; 711/E12.02

(58) Field of Classification Search
CPC .......... G06F 11/3476; G06F 2201/885; G06F 11/3409; G06F 2201/86; G06F 2201/88
USPC ....................................... 700/17, 11; 717/131
See application file for complete search history.

(56) References Cited

U.S. PATENT DOCUMENTS

| | | | |
|---|---|---|---|
| 5,768,500 A | | 6/1998 | Agrawal et al. |
| 5,930,477 A | * | 7/1999 | Uchida .......................... 709/236 |
| 6,286,070 B1 | * | 9/2001 | Ohara ............................ 710/113 |

(Continued)

FOREIGN PATENT DOCUMENTS

| | | |
|---|---|---|
| JP | 8-30494 | 2/1996 |
| JP | 11-85573 | 3/1999 |

(Continued)

OTHER PUBLICATIONS

Fujitsu limited, "SPARC64 VI Extensions", Mar. 27, 2007, pp. 242.*

(Continued)

*Primary Examiner* — Ryan Jarrett
*Assistant Examiner* — Olvin Lopez Alvarez
(74) *Attorney, Agent, or Firm* — Staas & Halsey LLP

(57) ABSTRACT

A processing apparatus, which contains a processor that executes a program includes a series of instructions, includes a log recording unit configured to record an operation log of the processing apparatus; a managing unit configured to control a recording operation performed by the log recording unit and read the operation log recorded in the log recording unit; an input unit configured to detect, from among the series of instructions of the executed program; a start instruction that starts a process for delivering a control instruction destined for the managing unit to the managing unit and deliver the control instruction to the managing unit in response to the start instruction; and an output unit configured to receive the operation log read by the managing unit.

10 Claims, 20 Drawing Sheets

(56) References Cited

U.S. PATENT DOCUMENTS

| | | | |
|---|---|---|---|
| 6,792,563 B1* | 9/2004 | DesRosier et al. | 714/43 |
| 7,020,808 B2* | 3/2006 | Sato et al. | 714/47.3 |
| 7,028,151 B2* | 4/2006 | Imai et al. | 711/156 |
| 7,047,521 B2* | 5/2006 | Bunnell | 717/130 |
| 7,093,108 B2* | 8/2006 | Swaine | 712/227 |
| 7,392,370 B2* | 6/2008 | DeWitt et al. | 712/227 |
| 7,574,587 B2* | 8/2009 | DeWitt et al. | 712/227 |
| 7,631,135 B2* | 12/2009 | Kubo et al. | 710/305 |
| 7,822,923 B2* | 10/2010 | Watanabe et al. | 711/117 |
| 7,979,762 B2* | 7/2011 | Esaka et al. | 714/727 |
| 7,992,051 B2* | 8/2011 | Al-Omari et al. | 714/45 |
| 8,180,794 B2* | 5/2012 | Plantenberg et al. | 707/781 |
| 8,214,628 B2* | 7/2012 | Hirai et al. | 712/244 |
| 8,219,748 B2* | 7/2012 | Uehara et al. | 711/114 |
| 8,271,494 B2* | 9/2012 | Heisig et al. | 707/737 |
| 8,271,711 B2* | 9/2012 | Hirai et al. | 710/260 |
| 2004/0243981 A1 | 12/2004 | Luk et al. | |
| 2005/0268172 A1 | 12/2005 | Uchinomiya et al. | |
| 2006/0117229 A1* | 6/2006 | Swaine et al. | 714/45 |
| 2006/0129999 A1* | 6/2006 | Hiraoka et al. | 717/128 |
| 2006/0259703 A1* | 11/2006 | Sohm et al. | 711/122 |
| 2007/0006172 A1* | 1/2007 | Swoboda et al. | 717/128 |
| 2007/0006174 A1* | 1/2007 | Sohm et al. | 717/131 |
| 2007/0150871 A1* | 6/2007 | Barsness et al. | 717/128 |
| 2007/0220237 A1 | 9/2007 | Kimura | |
| 2007/0234298 A1 | 10/2007 | Hirai et al. | |
| 2008/0065733 A1 | 3/2008 | Umetsu | |
| 2008/0155352 A1 | 6/2008 | Bakthavachalam et al. | |
| 2009/0083715 A1* | 3/2009 | DeWitt et al. | 717/128 |
| 2009/0083716 A1* | 3/2009 | Kimura | 717/129 |
| 2009/0106741 A1* | 4/2009 | Dageville et al. | 717/128 |
| 2009/0113398 A1* | 4/2009 | Birkill et al. | 717/128 |
| 2009/0138859 A1* | 5/2009 | Chen et al. | 717/131 |
| 2009/0150599 A1* | 6/2009 | Bennett | 711/103 |
| 2009/0172296 A1* | 7/2009 | Tsuji et al. | 711/143 |
| 2009/0172360 A1* | 7/2009 | Hikichi | 712/216 |
| 2009/0265695 A1* | 10/2009 | Karino | 717/131 |
| 2009/0282294 A1* | 11/2009 | Edwards | 714/45 |

FOREIGN PATENT DOCUMENTS

| | | |
|---|---|---|
| JP | 2001-51874 | 2/2001 |
| JP | 2005-215816 | 8/2005 |
| JP | 2005-339107 | 12/2005 |
| JP | 2006-524375 | 10/2006 |
| JP | 2007-249534 | 9/2007 |
| JP | 2007-272692 | 10/2007 |
| WO | 00/29951 | 5/2000 |
| WO | 2004/107177 A2 | 12/2004 |

OTHER PUBLICATIONS

JP 11-085573 Kazuko Machine Translation, "System and Method for Measuring Performance and Recording Medium Recording Measuring Control Program Therefor", pp. 10.*
European Office Action dated Oct. 19, 2011 issued in corresponding European Patent Application No. 10156867.3.
European Search Report dated Jul. 2, 2010 issued in corresponding European Patent Application No. 10156867.3.
Japanese Office Action mailed Feb. 26, 2013 in corresponding Japanese Patent Application No. 2009-065959.

* cited by examiner

FIG. 3A

| Register Destination | OP3 | RS1 | I = 0 | IMM_ASI | RS2 |
|---|---|---|---|---|---|
| 31 30 29 | 25 24 | 19 18 | 14 13 | 12 5 | 4 0 |

FIG. 3B

| Register Destination | OP3 | RS1 | I = 1 | SIMM13 |
|---|---|---|---|---|
| 31 30 29 | 25 24 | 19 18 | 14 13 | 12 0 |

FIG. 4

| NACK_code[3:0] | DESCRIPTION | NOTE |
|---|---|---|
| 0 | IN USE BY SERVICE PROCESSOR | RETRY BY SOFTWARE |
| 1 | EXECUTION OF ASI-BASED JTAG INHIBITED | REQUEST FROM USER WHO IS NOT ALLOWED TO SUBMIT JTAG COMMAND |
| 2 | EXECUTION OF SPECIFIED JIR INHIBITED | SOFTWARE BUG |
| 3 | JTAG INVOKED WITH BUSY = "1" | SOFTWARE BUG |
| 4 THROUGH e | RESERVE | |
| f | ERROR | HARDWARE ERROR |

FIG. 9

| BEFORE EXECUTION | | | AFTER EXECUTION | | |
|---|---|---|---|---|---|
| REGISTER | COMMAND | | REGISTER | | STATE |
| rcv.LOCK | acc.LOCK | acc. LOCK_ID | rcv.LOCK_ID | rcv.BUSY/NACK | command |
| 0 | 0 | DON'T CARE | UNCHANGED | UNCHANGED | NOT EXECUTE |
| 0 | 1 | DON'T CARE | acc.LOCK_ID | 1/0 | EXECUTE |
| 1 | 0 | DON'T CARE | acc.LOCK_ID | 0/0 | NOT EXECUTE |
| 1 | 1 | EXCEPT 0x7f | UNCHANGED | UNCHANGED | NOT EXECUTE |
| 1 | 1 | 0x7f | UNCHANGED | 1/0 | EXECUTE |

PROCESSING APPARATUS AND METHOD FOR ACQUIRING LOG INFORMATION

CROSS-REFERENCE TO RELATED APPLICATION

This application is based upon and claims the benefit of priority of the prior Japanese Patent Application No. 2009-65959, filed on Mar. 18, 2009, the entire contents of which are incorporated herein by reference.

FIELD

Embodiments discussed herein relate to a technique for collecting operation states of a processing apparatus such as a computer, and analyzing the collected operation states.

BACKGROUND

In order to analyze the operation states of the hardware of a processing apparatus such as a computer, a variety of techniques have been developed.

For example, a system in which a plurality of units such as a performance monitor (a PM circuit), a central processing unit (CPU), and an input/output unit are connected to a data bus has been developed. In such a system, the PM circuit detects an event to be monitored and stores the result of monitoring in a storage area provided in the PM circuit. In addition, a system has been developed that includes a comparator register and an interrupting line so that an interruption of a processor occurs when a counter value is equal to a predetermined value. Furthermore, in a CPU performance profiling called a hardware monitor incorporated in an instruction processor of an information processing apparatus, a function of generating an interruption when a target event occurs a number of times more than a predetermined threshold value has been developed.

For example, the following Patent Documents describe techniques of analyzing a hardware operation state:
Japanese National Publication of International Application No. 2006-524375,
Japanese Laid-open Patent Publication No. 2005-339107,
Japanese Laid-open Patent Publication No. 08-30494,
Japanese Laid-open Patent Publication No. 2005-215816,
Japanese Laid-open Patent Publication No. 2007-249534, and
Japanese Laid-open Patent Publication No. 2007-272692.

Existing processing apparatuses may determine whether the expected performance is achieved by monitoring the instruction execution time and the number of cache misses using a performance analyzer or a performance monitor. However, in order to improve the performance of the processing apparatus when a user program is executed and the expected performance is not achieved, it is difficult to use existing performance analyzers. For example, a user may not know the reason why the processing apparatus does not operate as expected only using, for example, the number of events.

SUMMARY

According to an aspect of the invention, a processing apparatus, which includes a processor that executes a program including a series of instructions, includes a log recording unit configured to record an operation log of the processing apparatus; a managing unit configured to control a recording operation performed by the log recording unit and read the operation log recorded in the log recording unit; an input unit configured to detect, from among the series of instructions of the executed program, a start instruction that starts a process for delivering a control instruction destined for the managing unit to the managing unit and deliver the control instruction to the managing unit in response to the start instruction; and an output unit configured to receive the operation log read by the managing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B illustrate an example of an ASI space direct identifier command and an example of an ASI space indirect identifier command, respectively;

FIG. 4 illustrates an example of the definition of NACK_code;

FIG. 9 illustrates an example of values set in command data when acquiring of a lock and release of the lock is attempted and a change in the state of the register;

DESCRIPTION OF EMBODIMENTS

Figure 1:
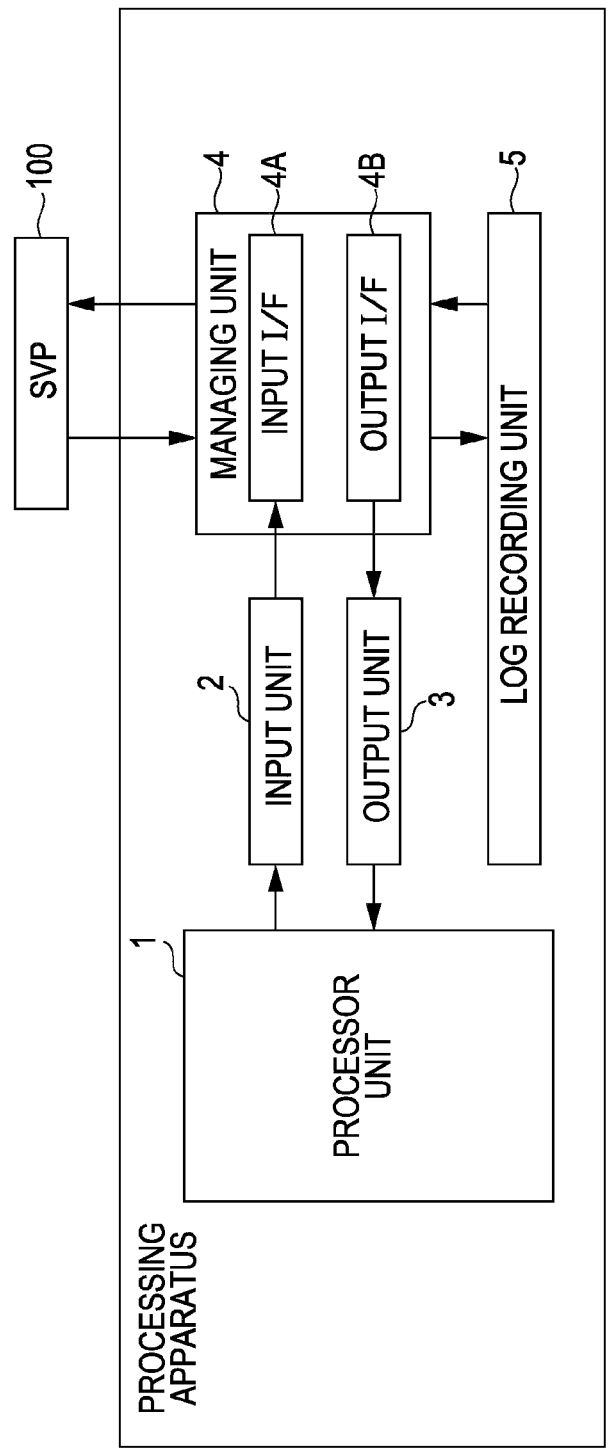
FIG. 1 illustrates a processing apparatus according to a first embodiment of the present invention.

Various embodiments of the present invention are described below with reference to the accompanying drawings. It should be noted that the embodiments are only illustrative, and the present invention is not limited thereto.

First Embodiment

In order to analyze the performance of a computer, an analyzing tool known as a performance analyzer is used. By using a performance analyzer, a user of the computer may monitor an instruction execution time required when the computer executes a program and the number of events, such as the number of cache misses. By using such a monitoring result, the user modifies a program to be executed by the computer.

Suppose that a cache miss occurs in a computer more frequently than anticipated. In addition, suppose that the cache miss is caused by thrashing due to data items stored at different physical addresses. For example, thrashing occurs if data items that are registered in the same index address of the cache line and that are more than the number of the cache ways are used at the same time.

In such a case, the user may observe the number of cache misses occurring in the computer. However, in order to identify whether the cache miss is caused by thrashing or insufficient cache memory capacity, monitoring of the number of cache misses is not sufficient. In addition, even when it may be identified that the cache miss is caused by thrashing, it is difficult to identify at which address thrashing is being caused.

Accordingly, the user may not obtain information that aids in tuning of a program or may not find the reason for the cause of thrashing. This problem makes it difficult to tune the program code and, therefore, it is difficult to improve the performance of a computer.

To allow a user to recognize the occurrence of thrashing and a program execution status, the hardware of a computer includes a log recording unit. The log recording unit is also referred to as a "history random access memory (RAM)". However, an interface of a log recording unit accepts commands received from an administrator processor, but not commands received from a user computer. The administrator processor is also called a service processor or a system control unit. The service processor has a function of monitoring the internal state of a computer system or controlling the internal components of the computer system.

The user is not allowed to access the service processor. Accordingly, the user may not operate the service processor and, therefore, the user may not use the log recording unit in synchronization with execution of a user program. For example, the user may not start or stop accumulation of a log performed by the log recording unit at a time around which a desired series of instructions of the user program is executed. Consequently, it is difficult to acquire a log recorded at a time around which a desired series of instructions of the user program is executed.

The service processor is disposed in a system independent from a user computer. The system has a particular processing procedure. That is, the service processor system is not designed for normal users.

If a user is allowed to operate a service processor, the user may operate the critical function of the computer or may access an internal unit of the computer a number of times that exceeds the maximum number. Accordingly, there is a risk of malfunction of the computer if a user is allowed to operate a service processor. If a problem occurs by allowing a user to operate a service processor, it is significantly difficult to solve the problem.

In order to maintain the safety of a computer, the readout from the log recording unit by a service processor is used only by the service processor itself or a system connected to the service processor. In an environment in which a service processor serving as an independent system that a user computer cannot recognize is used, log information is transferred from the service processor to a user computer via a network. Accordingly, it becomes inconvenience for the user to obtain the log information. For example, when a user program is executed, it is difficult to record information regarding the internal operation of a computer in the log recording unit under conditions desired by the user.

Therefore, according to the present embodiment, a technique for providing information accumulated in a log recording unit to a user computer system without using the function of a service processor is described. According to the present embodiment, log information to be recorded in the log recording unit is acquired safely in cooperation with a user computer and, subsequently, is provided to the user computer. As used herein, the term "safely" refers to a state in which, if an access performed by the user computer that causes a user computer to malfunction is detected, the access is prohibited.

In addition, the term "acquisition in cooperation with a user computer" refers to a state in which, for example, when a user computer executes processing specified by a user, event information generated by the user computer at that time may be accumulated and provided to a user. According to the present embodiment, when a user computer executes processing specified by a user, information indicating which event occurs in the computer is provided to the user.

Hereinafter, a computer is also referred to as a "computer system". In particular, the term "computer system" is used for a system including a plurality of processors, a bus connecting the plurality of processors to one another, and a memory. However, in the present embodiment, the terms "computer" and "computer system" are not always strictly distinguished.

A processing apparatus according to the first embodiment is described with reference to FIG. 1. FIG. 1 illustrates an exemplary configuration of the processing apparatus. As illustrated in FIG. 1, the processing apparatus includes a processor unit 1, an input unit 2, an output unit 3, a managing unit 4, and a log recording unit 5. For example, a CPU of a computer or a computer system including a CPU serves as the processing apparatus illustrated in FIG. 1.

The processor unit 1 executes a user program. The user program includes a series of instruction codes executable by the processor unit 1. The user program is loaded at a location indicated by a virtual address in a memory corresponding to a virtual address space. In this case, the memory may include one or more layers of cache memories.

By executing a user program, the processor unit 1 realizes a variety of functions. In order to realize the variety of functions, the processor unit 1 reads an instruction to be executed next time from the user program in the memory, decodes the readout instruction, executes the instruction, and stores the result of execution in the memory.

The log recording unit 5 records a variety of events occurring in the processing apparatus or the operation status of the processing apparatus in the form of operation log information. Examples of information regarding the event occurring in the processing apparatus include the memory address accessed by the processor unit 1, a hit or miss status of a cache memory, the start and end of a particular instruction, and the number of executions of a particular instruction.

The managing unit 4 provides a diagnostic function of monitoring each unit of the processing apparatus or diagnosing each of the units. For example, the managing unit 4 instructs the log recording unit 5 to start or stop acquiring an operation log. In addition, the managing unit 4 provides, to the log recording unit 5, conditions for starting or stopping acquiring an operation log.

When the managing unit 4 provides the conditions for starting or stopping acquiring an operation log and if the provided condition is satisfied, the log recording unit 5 starts or stops acquiring an operation log. For example, when a specified event occurs in the processing apparatus, the log recording unit 5 starts or stops acquiring an operation log.

In addition, the log recording unit 5 counts the number of events indicated by the managing unit 4. If the count value of the events indicated by the managing unit 4 reaches a specific value, the log recording unit 5 starts or stops acquiring an operation log in the processing apparatus. In this way, the managing unit 4 controls a recording process of an operation log performed by the log recording unit 5.

For example, a service processor 100 is connected to the processing apparatus. The service processor 100 includes an interface that exchanges data with the managing unit 4. The service processor 100 sends a command to the managing unit 4 via the interface and requests the managing unit 4 to monitor each of the internal units of the processing apparatus and start or stop acquiring an operation log. Upon receiving the request from the service processor 100, the managing unit 4 monitors each of the internal units of the processing apparatus, diagnoses each of the units, or acquires an operation log. Thereafter, the managing unit 4 returns the monitoring result, the diagnostic result, and/or the operation log to the service processor 100 via the interface.

The service processor 100 performs monitoring and diagnosis of a processing apparatus via the interface with the managing unit 4. During processing performed by the service processor 100, each of the internal units of the processing apparatus is accessed. Accordingly, if a user is allowed to use the functions of the service processor 100, the operation of the processing apparatus may malfunction. Therefore, in general, the monitoring and diagnostic functions of the service processor 100 are not available to users.

Therefore, according to the present embodiment, the processing apparatus includes the input unit 2 and the output unit 3. The input unit 2 allows the processor unit 1 to access the managing unit 4, and the output unit 3 receives, from the managing unit 4, information acquired inside the processing apparatus.

The managing unit 4 receives a control instruction from the input unit 2 and accepts a request indicated by the control instruction. Thus, the managing unit 4 monitors and diagnoses each of the units of the processing apparatus. The managing unit 4 further acquires an operation log of each of the units. Unlike the request from the service processor 100, the managing unit 4 may only recognize acceptable requests from the processor unit 1 when the managing unit 4 performs processing. That is, the managing unit 4 may reject a particular request from the processor unit 1. Examples of such a particular request include a request that interferes with the operation performed by the processing apparatus.

Instructions executed by the processor unit 1 include the following two types of instruction: an instruction of a first type executed by the processor unit 1 (e.g., a normal arithmetic instruction), and an instruction of a second type passed to the input unit 2. A start instruction is used for instructing the input unit 2 to deliver, to the managing unit 4, a control instruction to be executed by the managing unit 4. The start instruction specifies a control instruction to be written to the input unit 2 and data associated with the control instruction.

Upon detecting a start instruction output from the managing unit 4, the input unit 2 acquires the control instruction and data associated with the control instruction specified in the detected start instruction. Thereafter, the input unit 2 delivers the acquired control instruction and data to an input interface 4A of the managing unit 4. That is, the input unit 2 stores the control instruction and data in, for example, a register in the managing unit 4 and starts the processing performed by the managing unit 4.

Upon receiving the control instruction from the input unit 2 via the input interface 4A, the managing unit 4 determines whether processing requested by the service processor 100 is not being performed. If processing requested by the service processor 100 is being performed, the managing unit 4 does not execute the control instruction received from the input unit 2. That is, the managing unit 4 prioritizes the processing performed for the service processor 100 over the processing performed for the control instruction.

However, if processing requested by the service processor 100 is not being performed, the managing unit 4 determines whether or not the control instruction delivered from the input unit 2 is allowed as a request from the processor unit 1. If the control instruction delivered from the input unit 2 is not one of control instructions allowed for a request from the processor unit 1, the managing unit 4 returns an error message to the output unit 3 via an output interface 4B. In such a case, the output unit 3 reports the occurrence of an error to the processor unit 1.

However, if the control instruction delivered from the input unit 2 is allowed as a request from the processor unit 1, the managing unit 4 performs processing in accordance with the control instruction received from the input unit 2. For example, the managing unit 4 instructs the log recording unit 5 to start or stop acquiring an operation log. Thus, the managing unit 4 controls a recording process. In addition, the managing unit 4 sets a condition for starting or stopping acquiring the operation log using the data associated with the control instruction. The data associated with the control instruction is input from a program executed by the processor unit 1 via the input unit 2. Accordingly, events and statuses inside the processing apparatus are recorded in the log recording unit 5 concurrently with the operation of the program. Events represent the operations of each unit disposed inside the processing apparatus.

The control instructions include an instruction for instructing the managing unit 4 to perform a readout operation from the log recording unit 5. Upon receiving a control instruction indicating a readout operation, the managing unit 4 reads information recorded in the log recording unit 5 and delivers the readout information to the output unit 3 via the output interface 4B. The output unit 3 then delivers, to a program being executed by the processor unit 1, the information stored in the history recording unit 5 and received from the managing unit 4.

As described above, according to the present embodiment, the processor unit 1 of the processing apparatus may execute the following two types of instructions: the instruction of a first type executed in a normal information processing and the instruction of a second type including a start instruction for starting processing for delivering a control instruction to the managing unit 4. Accordingly, by writing a start instruction in addition to instructions of the first type in a user program, a user may request the managing unit 4 to perform a monitoring/diagnosis function at desired points of time while the processor unit 1 is executing the user program.

Consequently, according to the present embodiment, the processing apparatus may acquire information regarding the status inside the processing apparatus if, for example, a desired performance may not be achieved when a user program is executed. That is, a user may insert, into a user program, a start instruction and a control instruction that request the managing unit 4 to perform a diagnosis operation. When a compiler compiles a source program, a control instruction and a start instruction are generated. By causing the processing apparatus to execute the program including the start instruction specifying a control instruction to be sent to the managing unit 4, the user may acquire the internal state of the processing apparatus at a desired point of time while the user program is being executed.

According to the present embodiment, without using the function of the service processor 100, the log recording unit 5 may safely acquire the internal state of the user computer system in response to a request from the computer system and in synchronization with the processing performed by the computer system. Thereafter, the managing unit 4 may provide the information acquired by the log recording unit 5 to the user computer system.

Note that, in FIG. 1, the input unit 2 and the output unit 3 are disposed in a circuit block different from the processor unit 1. However, the configuration of the processing apparatus is not limited thereto. For example, the input unit 2 and the output unit 3 may be disposed in the processor unit 1.

Second Embodiment

According to a second embodiment of the present invention, a performance analyzing process is described with reference to the case in which a processing apparatus includes a cache memory. That is, in the second embodiment, the technique for controlling a recording operation performed by a log recording unit and providing the recorded operation log of the processing apparatus to a user is described.

Figure 2:
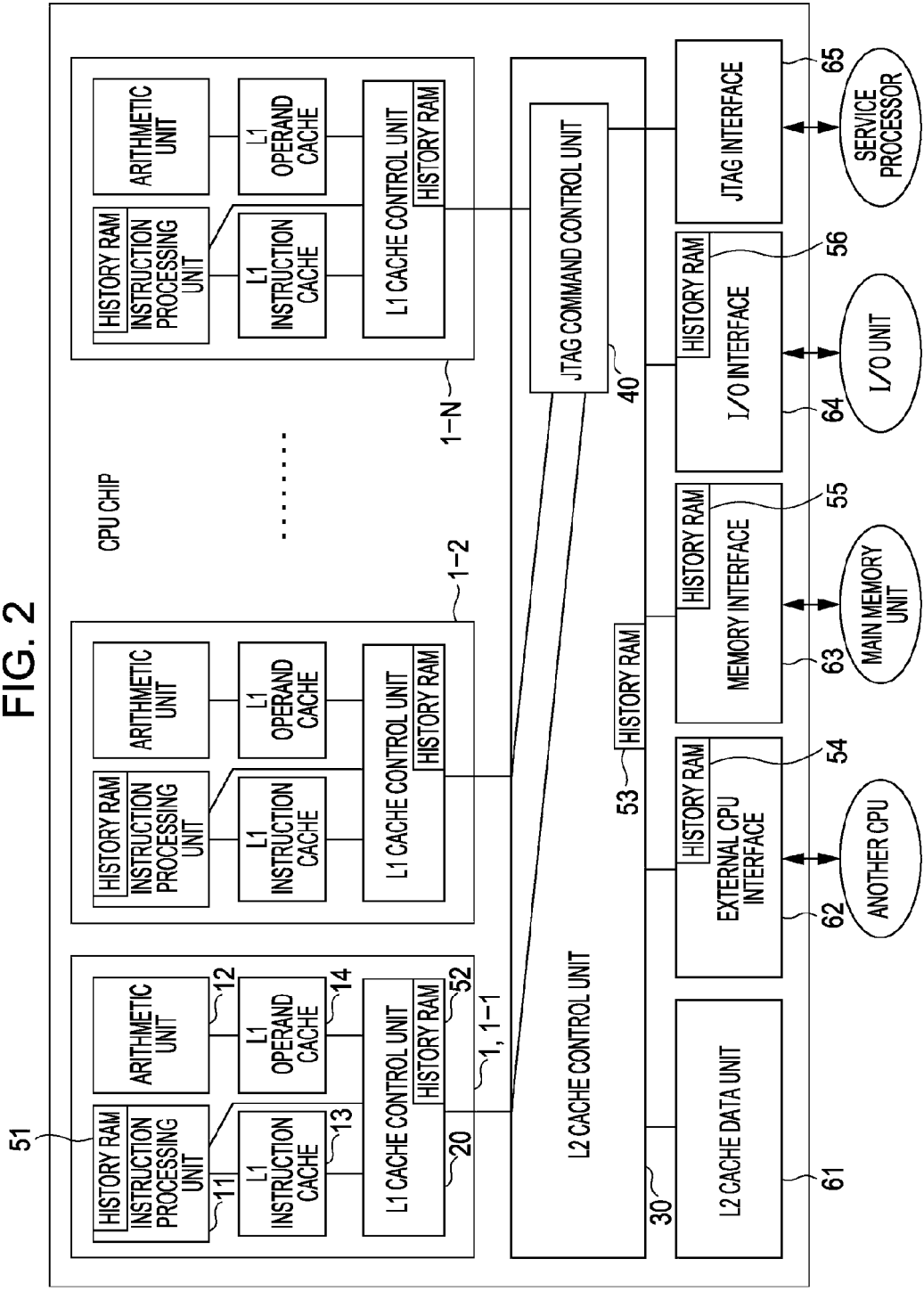
FIG. 2 illustrates a processing apparatus according to a second embodiment of the present invention.

FIG. 2 illustrates an exemplary configuration of a processing apparatus according to the second embodiment. As illustrated in FIG. 2, for example, the processing apparatus is a CPU of a computer or a computer system including a CPU. According to the present embodiment, the processing apparatus includes a plurality of processor units 1, an L2 cache control unit 30 that receives a request from a processor unit 1 (e.g., a memory access request), an L2 (Level-2) cache data unit 61 accessed by the L2 cache control unit 30, and a variety of interfaces.

In the present embodiment, individual processor units 1 are denoted by processor units 1-1, 1-2 . . . , and 1-N. That is, the plurality of processor units are collectively referred to as a "processor unit 1". The processor unit 1 may also be referred to as a "processor core 1" or simply a "core 1".

The processor unit 1 includes an instruction processing unit 11, an arithmetic unit 12, an L1 (Level-1) instruction cache 13, an L1 operand cache 14, and an L1 cache control unit 20.

The instruction processing unit 11 decodes an instruction retrieved from the L1 instruction cache 13 and manages execution of the decoded instruction. If the decoded instruction is an arithmetic instruction, the instruction processing unit 11 performs an arithmetic operation using the arithmetic unit 12. However, if the decoded instruction is a load instruction or a store instruction of the operand data that is used for the arithmetic operation, the instruction processing unit 11 computes the operand address using the arithmetic unit 12. Thereafter, the instruction processing unit 11 delivers the computed operand address to the L1 operand cache 14. Subsequently, the instruction processing unit 11 writes data at a desired address or reads data at a desired address.

The L1 cache control unit 20 receives, from the instruction processing unit 11, a fetch request for the L1 instruction cache 13 and a load/store request for the L1 operand cache 14. Thereafter, the L1 cache control unit 20 converts a virtual address contained in the received request into a physical address using a translation lookaside buffer (TLB). In addition to converting the address, the L1 cache control unit 20 searches for a cache tag and determines whether the data located at the desired address is present in an L1 cache. Hereinafter, the L1 instruction cache 13 and the L1 operand cache 14 together are referred to as an "L1 cache".

When the data located at the requested address is present in the L1 cache and if the request indicates an instruction fetch, the L1 cache control unit 20 delivers the data retrieved from the L1 instruction cache 13 to the instruction processing unit 11. However, if the request indicates an operand fetch, the L1 cache control unit 20 delivers the data retrieved from the L1 operand cache 14 to the arithmetic unit 12.

In contrast, if the request indicates a store request, the L1 cache control unit 20 waits for delivery of store data from the arithmetic unit 12. Thereafter, the L1 cache control unit 20 ensures that a store target address received from the arithmetic unit 12 is present in the L1 cache. Subsequently, the L1 cache control unit 20 writes the store data to the L1 operand cache 14 in accordance with the order in which the instructions are to be executed.

As used herein, the term "L1 cache" refers to a cache memory in a layer that is the closest to the processor unit 1 in a layer structure of caches in the processing apparatus. The term "L2 cache" refers to a cache memory in a layer that is located next to the layer of the L1 cache. In general, the data transfer time of the L2 cache may be longer than that of the L1 cache. However, the capacity of the L2 cache may be greater than that of the L1 cache.

If the data located at the address used by the instruction fetch request or an operand load/store request is not present in the L1 cache, that is, if an L1 cache miss occurs, the L1 cache control unit 20 sends the target address information to the L2 cache control unit 30. Thus, the L1 cache control unit 20 requests the L2 cache control unit 30 to transfer the target data into the L1 cache.

The L2 cache control unit 30 is connected to an L2 cache data unit 61, an external CPU interface 62, a memory interface 63, an I/O interface 64, and a JTAG interface 65.

The L2 cache data unit 61 functions as a cache memory for storing data. The external CPU interface 62 is an interface used when the processing apparatus illustrated in FIG. 2 communicates with a different processing apparatus. The memory interface 63 is an interface that exchanges data with a main memory unit. The main memory unit is also referred to as a "physical memory". The I/O interface 64 is an interface used when an input/output unit is connected to the processing apparatus. Examples of the input/output unit include an incorporated external storage unit, a removable storage unit, and a local area network (LAN) board. The JTAG interface 65 is an interface used when the processing apparatus is connected to the service processor 100.

The L2 cache control unit 30 determines whether the address requested by the L1 cache control unit 20 is present in the L2 cache. If the address requested by the L1 cache control unit 20 is present in the L2 cache, the L2 cache control unit 30 retrieves the requested data from the L2 cache data unit 61 and delivers the data to the L1 cache.

However, if the address requested by the L1 cache control unit 20 is not present in the L2 cache, the L2 cache control unit 30 sends, to the external CPU interface 62 or the memory interface 63, a request for retrieving the requested data. Thus, the L2 cache control unit 30 receives the desired data located at the requested address from the external CPU interface 62 or the memory interface 63. In addition, the L2 cache control unit 30 writes the received data into the L2 cache data unit 61. Furthermore, the L2 cache control unit 30 transfers the received data to the L1 cache.

As illustrated in FIG. 2, the processing apparatus includes the I/O interface 64 that receives a request from an I/O unit, such as a file system. Upon receiving a request from the I/O interface 64, the L2 cache control unit 30 determines whether the requested data is present in the L2 cache. If the requested data is present in the L2 cache, the L2 cache control unit 30 retrieves the latest data from the L2 cache data unit 61 or the L1 operand cache 14. Thereafter, the L2 cache control unit 30 sends the retrieved data to the I/O unit via the I/O interface 64.

In addition, the processing apparatus includes the JTAG interface 65 that receives a joint test action group (JTAG) command submitted from the service processor 100. The JTAG command set is defined for controlling an LSI chip, such as a CPU chip. Using a JTAG command, the operation of an LSI is started or stopped. In addition, using a JTAG command, the operation of a CPU (e.g., readout of data from a scan chain and a particular register in the CPU) is controlled. The command received through the JTAG interface 65 is sent to a JTAG command control unit 40 provided in the L2 cache control unit 30. Note that the JTAG command control unit 40 may correspond to the managing unit 4 of the first embodiment.

The JTAG command control unit 40 decodes the received JTAG command and executes the operation indicated by the JTAG command. If desired, the JTAG command control unit 40 returns the execution result to the service processor 100 via the JTAG interface 65.

In addition, according to the present embodiment, the units of the processing apparatus (the instruction processing unit 11, the L1 cache control unit 20, the L2 cache control unit 30, the external CPU interface 62, the memory interface 63, and the I/O interface 64) include log recording units (history RAMs) 51 to 56, respectively. The history RAMs 51 to 56 record a log of processing performed by the corresponding units. Hereinafter, the history RAMs 51 to 56 are also collectively referred to as a "history RAM" without using a reference numeral.

A history RAM 51 included in the instruction processing unit 11 records the address of an instruction currently executed by the instruction processing unit 11 and some in-progress instructions. As used herein, the term "in-progress instruction" refers to an instruction that has been fetched, but has not yet been decoded or executed.

The history RAM 52 included in the L1 cache control unit 20 and the history RAM 53 included in the L2 cache control unit 30 record information regarding the operation state of a cache pipeline, the address and the type of request when a cache hit occurs, and the address and the type of request when a cache miss occurs.

The history RAM 54 included in the external CPU interface 62, the history RAM 55 included in the memory interface 63, and the history RAM 56 included in the I/O interface 64 each records a received request.

Each of the history RAMs 51 to 56 includes a history control unit that controls the corresponding history RAM. An example of the history control unit is illustrated as a history control unit 51A illustrated in FIG. 6. Hereinafter, the history control units are collectively referred to as a "history control unit" without using a reference numeral.

In response to an instruction received from the JTAG command control unit 40, the history control unit may select one log information item from among a plurality of types of log information items accumulated in each of the history RAMs 51 to 56. The history control unit is also referred to as a "RAM read/write logic unit". In response to a request from the JTAG command control unit 40, the history control unit may select log information to be recorded or a point of time at which the log information is to be recorded and record the log information in the history RAM. Hereinafter, "recording of history information" is also referred to as "storing of history information" or "acquiring of history information".

The instruction processing unit 11 and the JTAG command control unit 40 may start and stop recording a log, read a log, instruct to resume recording, and select the type of log information to be recorded. The instruction processing unit 11 and the JTAG command control unit 40 sets, in a register of the history control unit, an instruction to start or stop recording a log, to read a log, and to send information indicating when various processes are resumed and which type of log information is to be recorded. In this way, the instruction processing unit 11 and the JTAG command control unit 40 may acquire log information regarding events occurring in each of the units of the processing apparatus under the specified condition. In general, the JTAG command control unit 40 instructs the history control unit to stop and resume recording of log information by using a JTAG command. However, in some particular cases, the instruction processing unit 11 may instruct the history control unit to stop and resume recording of log information.

Command Interface

For the processing apparatus according to the present embodiment, a user may use the JTAG commands relating to a log operation. Examples of log operation include starting and stopping recording a log, reading a log, resuming recording of a log, and selecting the type of log information to be recorded. The processing apparatus according to the present embodiment includes an interface that selects a command relating to a log operation from among instructions executed by the processor unit 1 and delivers the selected command to the JTAG command control unit 40. The following description is made with reference to a SPARC (registered trademark) chip serving as a processing apparatus.

The SPARC-V9 instruction set includes instructions called ASI (address space identifier) commands. An ASI command allows an ID called an 8-bit ASI space number to be attached to a normal load/store instruction.

By using the ASI space number, one of the address spaces (e.g., a primary address space, a secondary address space, a nucleus address space, and the like) referenced by the load/store instruction may be selected. When an ASI command is input, that is, when an ASI command is fetched, the virtual address specified by the operand of the input ASI command is converted into a physical address using a TLB. The processor unit 1 provided in the L1 cache control unit 20 retrieves information associated with a set of a physical address and the virtual address defined in the address space specified by the ASI space number from the TLB. Thereafter, the processor unit 1 converts the virtual address specified by the operand of the ASI command into a physical address.

Since the ASI space number is an 8-bit ID, 256 different spaces may be logically specified. However, in practice, as many as 256 address spaces are not defined. Thus, an ASI space number that is not assigned to any address space appears. The ASI space number that is not assigned to any address space may be used for defining a new space other than existing address spaces. For example, when a new ASI space number is defined, the ASI space number may be used for an address conversion operation in which a virtual address is treated as a physical address. In addition, the ASI space number is used for reading and writing data from and to a control register in the processing apparatus.

Furthermore, data is read from or written to some of the control registers in the processing apparatus by specifying a particular ASI space number in advance. That is, such an ASI space is defined for the processing apparatus. In order to read and write data from and to a control register in the processing apparatus, some of the least significant 8 bits (e.g., 5 bits) of the virtual address used for reading and writing data from and to a control register are used. Thus, one of 32 registers may be selected using an ASI space number. In this way, the number of registers to be accessed may be expanded.

As described above, the ASI command system is defined so that, by using an ASI command, a virtual address may be converted into a physical address using a desired space, and reading and writing data from and to a control register in the processing apparatus are available.

FIGS. 3A and 3B illustrate an example of a data pattern of an ASI command. FIG. 3A illustrates an example of an ASI space direct identifier command. As illustrated in FIG. 3A, the first 2 bits (fixed to "11") and OP3 (bit 24 to bit 19) specifies an operation code. The operation code indicates two types of instructions: a load instruction and a store instruction.

Register Destination (bit 29 through bit 25) indicates a register of the processor unit 1 that holds data to be loaded or stored. RS1 (bit 18 through bit 14) and RS2 (bit 4 through bit 0) indicate virtual addresses of a memory. For example, RS1 indicates a base address, and RS2 indicates a displacement address.

I (bit 13) of "0" indicates that the command directly specifies an ASI space number. When the command directly specifies an ASI space number, the operand of a command contains an ASI space number without using a register. That is, IMM_ASI (bit 12 through bit 5) in the data pattern contains an ASI space number.

FIG. 3B illustrates an example of an ASI space indirect identifier command. As illustrated in FIG. 3B, bit 13 of "1" indicates that the command is an ASI space indirect identifier command that indirectly specifies an ASI space. In an ASI space indirect identifier, an ASI space number is specified by a specific register (called an "ASI register"). In this case, a virtual address of a memory is specified by RS1 (bit 18 through bit 14) and SIMM13 (bit 12 through bit 0).

In the processing apparatus according to the present embodiment, a new ASI space number is additionally defined. In addition, two virtual addresses are assigned to an ASI space specified by the ASI number.

For a set of the new ASI space number and the virtual address, an interface is provided that accepts a command that complies with a JTAG command that is submitted from the service processor 100. Hereinafter, the command that complies with a JTAG command is also referred to as a "JTAG command". That is, in the processing apparatus according to the present embodiment, a user program executed by the processor unit 1 may submit a JTAG command to the interface.

When the processor unit 1 executes an ASI command containing a specified set of a new ASI space number and a virtual address, the information located at the specified virtual address in the ASI space is delivered to the JTAG command control unit 40. That is, a new JTAG command is defined through an ASI command. As one of the functions of the JTAG command through an ASI command, the log may be accessed.

According to the present embodiment, the new ASI commands are referred to as "ASI_CMD_ACCESS_REG" and "ASI_CMD_RECEIVE_REG". The "ASI_CMD_ACCESS_REG" command is a command for submitting a JTAG command. The "ASI_CMD_RECEIVE_REG" command is a command used for performing exclusive control and reading the result of execution of a JTAG command.

The "ASI_CMD_ACCESS_REG" command is used for only write operations. The 64-bit data pattern for a write operation is defined as follows. That is, the following data pattern is defined for a first address of the newly defined ASI space.

Note that, in the following description, "data[ ]" represents a bit position in a bit pattern. In this case, a bit pattern may be based on a bit order. However, according to the present embodiment, the bit order is not clearly defined. For example, data[62:56] represents a bit pattern from bits 62 through 56.

data[63]=LOCK: "LOCK" represents an exclusive operation in order to avoid contention among a plurality of the processor units 1 that request execution of a JTAG command.

data[62:56]=LOCK_ID[0:6]: LOCK_ID is used for identifying the processor unit 1 that requests exclusive control.

data[55:48]=JIR[0:7]: JIR is JTAG command code.

data[47:36]=JSEL[0:11]: JSEL is selection information for selecting one of the processor units 1 or a unit (COREn/UNITm) in the processing apparatus. For example, by using the JTAG command, a processor unit 1 that accumulates log information is selected.

data[35:32]=receive(all="0"): These bits are not used in the present embodiment.

data[31:00]=JDR[0:31]: A parameter of a JTAG command. Note that, in the following description, the data pattern of the "ASI_CMD_ACCESS_REG" command is represented as "asi_cmd_access_reg.LOCK", "asi_cmd_access_reg.LOCK_ID", "asi_cmd_access_reg.JIR", "asi_cmd_access_reg.JSEL", "asi_cmd_access_reg.JDR". In addition, each of the sections of the data pattern may be represented in a simplified form, such as "acc.LOCK".

The "ASI_CMD_RECEIVE_REG" command is used for only a read operation. The 64-bit data pattern for a read operation is defined as follows. That is, the following data pattern is defined for a second address of the newly defined ASI space.

data[63]=LOCK: The bit represents whether the execution right is given as a result of exclusive control.

data[62:56]=LOCK_ID[0:6]: The bit pattern represents a processor that has acquired the execution right to execute a JTAG command.

data[55:54]=BUSY/NACK: When the bit pattern represents "BUSY", a JTAG command is being executed. However, when the bit pattern represents "NACK", a JTAG command was unable to be executed.

In addition, when the value of data[55:54] represents "NACK" (e.g., data[55:54]="01"), an error code is set to data[31:28] (JDR[0:3] described below). At that time, the value set in data[31:28] is NACK_code[3:0], which is illustrated in FIG. 4.

FIG. 4 illustrates a table that defines the NACK_code when "data[55:54]=NACK (e.g., "01")" is returned. The rows of the table illustrated in FIG. 4 include the value in NACK_code[3:0], the description of the value, and a note.

"NACK_code[3:0]=0" indicates that the service processor 100 is currently using the JTAG command control unit 40. That is, "NACK_code[3:0]=0" indicates that a JTAG command is being executed. When "data[55:54]=NACK" and "NACK_code[3:0]=0" are returned, a user program executed by the processor unit 1 retries the "ASI_CMD_ACCESS_REG" command that was written before "NACK_code[3:0]=0" is returned.

"NACK_code[3:0]=1" indicates that execution of an ASI-command-based JTAG command is prohibited. The value of NACK_code[3:0] indicates that, for example, although a request for executing an ASI-command-based JTAG command is sent, execution of the JTAG command is prohibited, or a user who is not allowed to execute a JTAG command is detected.

"NACK_code[3:0]=2" indicates that execution of a command specified in JIR[0:7] (i.e., a JTAG command) is prohibited. For example, this situation occurs when a JTAG command that is not allowed for a user is specified in JIR[0:7], and the "ASI_CMD_ACCESS_REG" command is written. In general, this situation may be caused by a bug in the user program.

"NACK_code[3:0]=3" indicates that a request for starting the execution of a JTAG command is made in a "BUSY" mode. In this example, the BUSY mode is a mode in which execution of a JTAG command received before the requested JTAG command is submitted (e.g., a JTAG command submitted from a different processor unit 1) has not been completed. In general, this situation may be caused by a bug in the user program.

"NACK_code[3:0]=f" indicates that a hardware error is detected. Note that the values in NACK_code[3:0] other than the above-described values (i.e., NACK_code[3:0]=4–e) are not used in the present embodiment.

The 64-bit data pattern for a read operation is described below.

data[53:48]=reserve(all="0")
data[47:40]=reserve(all="0")
data[39:32]=reserve(all="0")
data[31:00]=JDR[0:31]: The bits represent a return code of a JTAG command.

Note that the data pattern of the "ASI_CMD_RECEIVE_REG" command is represented as "asi_cmd_receive_reg.LOCK", "asi_cmd_receive_reg.LOCK_ID", "asi_cmd_receive_reg.BUSY/NACK", "asi_cmd_receive_reg.JDR", "asi_cmd_receive_reg.NACK_code". In addition, each of the sections of the data pattern is also represented in a simplified form, such as "rcv.LOCK", "rcv.LOCK_ID", "rcv.BUSY/NACK", and "rev.NACK_code".

According to the present embodiment, the processing apparatus further has a function of avoiding contention between a JTAG command received via the service processor 100 and a JTAG command received via an ASI command. The processing apparatus prohibits execution of an ASI-command-based JTAG command before execution of a JTAG command received via the service processor 100 is started. Accordingly, in order to perform the exclusive control of a JTAG command, the processing apparatus according to the present embodiment provides a register "JTAG_LOCK_SP_REG". The register "JTAG_LOCK_SP_REG" contains a 1-bit LOCK bit.

data[00]=LOCK: The bit indicates whether submit of a JTAG command is locked by the service processor 100.

Figure 5:
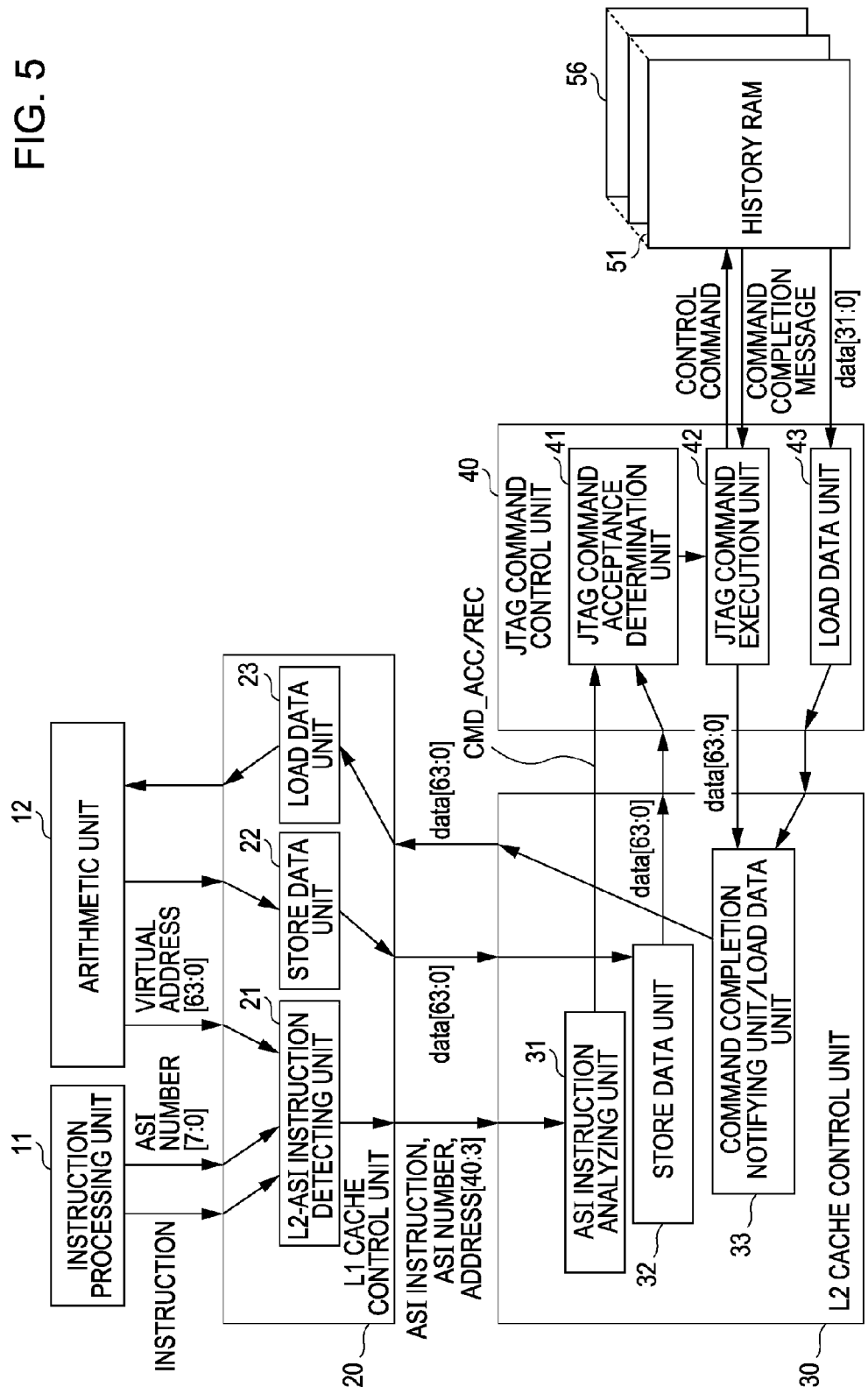
FIG. 5 illustrates the configuration of routes through which ASI-command-based JTAG commands are delivered to each of the processing units.

FIG. 5 illustrates the configuration of routes through which the above-described two ASI-command-based JTAG commands are delivered to each of the processing units.

An ASI command submitted from the instruction processing unit 11 is sent to the L1 cache control unit 20. The ASI command contains an instruction, an ASI number, and a virtual address. When the ASI command is a write instruction, the data to be written by the ASI command is also sent from the arithmetic unit 12 to a store data unit 22 of the L1 cache control unit 20.

As illustrated in FIG. 5, the L1 cache control unit 20 includes an L2-ASI instruction detecting unit 21, the store data unit 22, and a load data unit 23. The L2-ASI instruction detecting unit 21 of the L1 cache control unit 20 examines the ASI space number and 5 bits of the lower 8 bits of the virtual address contained in the received ASI command. Thereafter, if the L2-ASI instruction detecting unit 21 determines that the received ASI command is to be executed by the L2 cache control unit 30 (hereinafter referred to as an "L2-ASI command"), the L2-ASI instruction detecting unit 21 transfers the ASI command to the L2 cache control unit 30.

Note that the ASI command contains an ASI number and an address[40:3] in addition to the ASI instruction. When the ASI command is transferred, the ASI number and the 5 bits of the lower 8 bits of the virtual address of the ASI command are transferred together with the ASI command. In FIG. 5, the address[40:3] represents an area used for delivering the virtual address in the data pattern prepared by the processing apparatus. According to the present embodiment, for example, 5 bits (address[7:3]) of the area (address[40:3]) are used.

When the ASI command is a write instruction, the store data unit 22 sends the store data (data[63:0]) received from the arithmetic unit 12 to the L2 cache control unit 30. Accordingly, the store data unit 22 functions as a write buffer. In contrast, the load data unit 23 of the L1 cache control unit 20 functions as a buffer that outputs readout log information via the JTAG command control unit 40 and the L2 cache control unit 30.

The L2 cache control unit 30 includes an ASI instruction interpreting unit 31, a store data unit 32, and a command completion notifying unit/load data unit 33. The ASI instruction interpreting unit 31 of the L2 cache control unit 30 receives an ASI command submitted from the L1 cache control unit 20. When the received ASI command represents an instruction for submitting a JTAG command, the ASI instruction interpreting unit 31 requests the JTAG command control unit 40 to execute the "ASI_CMD_ACCESS_REG" command or the "ASI_CMD_RECEIVE_REG" command. Whether the ASI command submits a JTAG command is determined by using the ASI space number. In addition, whether the "ASI_CMD_ACCESS_REG" command or the "ASI_CMD_RECEIVE_REG" command is specified is determined by using the address[7:3].

If the requested operation is "ASI_CMD_ACCESS_REG", the store data unit 32 sends data[63:0] to the JTAG command control unit 40 together with the request. Using data[63:0], the L2 cache control unit 30 notifies the JTAG command control unit 40 of which one of the JTAG commands is to be executed. The ASI instruction interpreting unit 31 is an example of the input unit 2 illustrated in the first embodiment.

The JTAG command control unit 40 includes a JTAG command acceptance determination unit 41, a JTAG command execution unit 42, and a load data unit 43.

When the received JTAG command indicates a write request using the "ASI_CMD_ACCESS_REG" command, the JTAG command acceptance determination unit 41 of the JTAG command control unit 40 determines whether or not write permission is given using a write protection control circuit. For example, write permission is not given when a JTAG command is written using an ASI command and if the JTAG command is not allowed to be executed. If write permission is given, the JTAG command acceptance determination unit 41 updates the value in a register CMD_ACC (refer to FIG. 6) that receives the "ASI_CMD_RECEIVE_REG" command. Thereafter, the JTAG command execution unit 42 executes the written JTAG command.

The JTAG command execution unit 42 sends a signal corresponding to the written JTAG command, that is, a control signal to each unit of the processing apparatus. For example, the JTAG command execution unit 42 instructs the history control unit of each of the history RAMs 51 to 56 to start recording. In response to such an instruction, the history control unit of each of the history RAMs 51 to 56 returns a command completion message, for example. Upon receiving the command completion message, the JTAG command execution unit 42 completes the execution of the command. Note that, for example, the register CMD_ACC is included in the JTAG command control unit 40 (refer to FIG. 6). The "ASI_CMD_ACCESS_REG" command is written into the register CMD_ACC.

However, if write permission is not given, the JTAG command control unit 40 completes the execution of the command without updating the value in the register CMD_ACC. At that time, information indicating that an error occurs is returned to the arithmetic unit 12 via the L2 cache control unit 30 and the L1 cache control unit 20 using "NACK" and NACK_code.

When the JTAG command indicates a read request using "ASI_CMD_RECEIVE_REG", the JTAG command control unit 40 outputs, to the L2 cache control unit 30, a value read out in accordance with the register data format of the "ASI_CMD_RECEIVE_REG" command (data[31:0], that is, JDR[0:31]). Upon receiving the value, the L2 cache control unit 30 sends the value JDR[0:31] to the arithmetic unit 12 via the L1 cache control unit 20. More specifically, the load data unit 43 of the JTAG command control unit 40 delivers the readout value (JDR[0:31]) to the command completion notifying unit/load data unit 33 of the L2 cache control unit 30. The command completion notifying unit/load data unit 33 transfers the received value (JDR[0:31]) to the load data unit 23 of the L1 cache control unit 20. The command completion notifying unit/load data unit 33 is an example of the output unit 3 illustrated in the first embodiment.

As described above, according to the present embodiment, an interface with the JTAG command control unit 40 is defined by the L2-ASI command for accessing a new ASI space. For example, in the case of a normal load or store instruction that accesses a memory via, for example, the L1 operand cache 14, data to be read or written may be maintained in a cache and may not be maintained in the memory. Accordingly, the L2-ASI command is suitable as an instruction used for an interface between a user program executed by the processing apparatus and the JTAG command control unit 40.

In contrast, in the above-described configuration, the L2-ASI instruction detecting unit 21 detects the L2-ASI command and delivers the L2-ASI command to the ASI instruction interpreting unit 31 of the L2 cache control unit 30. In addition, the ASI instruction interpreting unit 31 may detect the "ASI_CMD_ACCESS_REG" command and the "ASI_CMD_RECEIVE_REG" command and write the commands into the JTAG command control unit 40.

The JTAG command control unit 40 includes a register for receiving the data pattern of each of the "ASI_CMD_ACCESS_REG" command and the "ASI_CMD_RECEIVE_REG" command. Accordingly, hereinafter, when the data pattern of the command is expressed, the data is referred to as "command data asi_cmd_receive_reg.LOCK" or "command data rcv.LOCK". In contrast, when the register is expressed, the registers are referred to as a "register asi_cmd_receive_reg.LOCK" or a "register rcv.LOCK". The same applies to the other data patterns.

Figure 6:
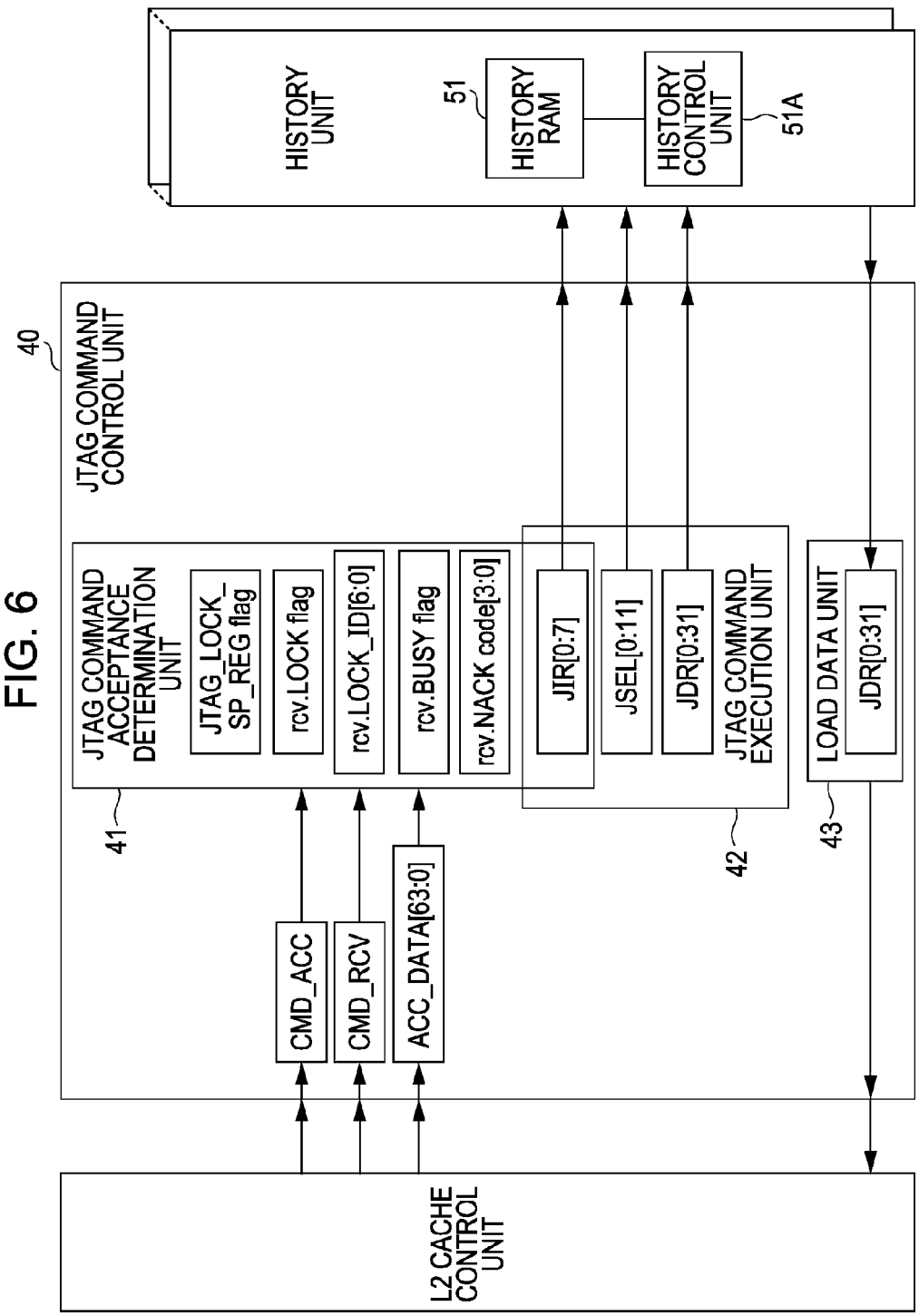
FIG. 6 illustrates a JTAG command control unit.

FIG. 6 illustrates an exemplary configuration of the JTAG command control unit 40 in detail. As illustrated in FIG. 6, the JTAG command control unit 40 includes the register CMD_ACC that receives the "ASI_CMD_ACCESS_REG" command, a register CMD_RCV that receives the "ASI_CMD_RECEIVE_REG" command, and a register ACC_DATA[63:0] that receives data written in the ASI space by the "ASI_CMD_ACCESS_REG" command. These registers CMD_ACC, CMD_RCV, and ACC_DATA[63:0] correspond to the input interface of the first embodiment.

The command and the data pattern written to these registers are written to the corresponding registers by a logic circuit of the JTAG command control unit 40. The registers included in the JTAG command control unit 40 are described below.

The JTAG command acceptance determination unit 41 of the JTAG command control unit 40 includes a register JTAG_LOCK_SP_REG, a register rcv.LOCK, a register rcv.LOCK_ID, a register rcv.BUSY, a register rcv.NACK_code, and a register rcv.JIR. The JTAG command acceptance determination unit 41 may refer to these registers.

The register JTAG_LOCK_SP_REG contains a flag used for exclusive control performed by the service processor 100. The registers rcv.LOCK and rcv.LOCK_ID contain flags used for exclusive control among a plurality of the processor units 1. The register rcv.BUSY contains a flag indicating whether a JTAG command is currently executed or not. An error code for the received JTAG command is set in the register rcv.NACK_code.

The register JDR is shared by the JTAG command acceptance determination unit 41 and the JTAG command execution unit 42. The register JIR contains the JTAG command code. The JTAG command execution unit 42 further includes registers JSEL and JDR. The register JSEL stores information used for identifying the processor unit 1 or an apparatus whose log is to be recorded. The register JDR stores a parameter of the JTAG command.

In accordance with the values contained in these registers, the JTAG command execution unit 42 sends an instruction to the processor unit 1 or an apparatus whose log is to be recorded. Examples of the instructions sent to the history control unit include a condition for acquiring an operation log, an instruction to start acquiring the operation log, and an instruction to read an operation log. The history RAM 51 and a history control unit 51A that controls the history RAM 51 are illustrated in FIG. 6.

The load data unit 43 includes a register JDR. The load data unit 43 stores information read from the history RAMs 51 to 56. When an "ASI_CMD_RECEIVE_REG" command is executed, the data in the register JDR is delivered to the command completion notifying unit/load data unit 33 of the L2 cache control unit 30. The load data unit 43 corresponds to the output interface of the first embodiment.

Command Submitting Procedure

A JTAG command submitting procedure using an ASI command is described below. In order to execute a JTAG command in a user program, the processing apparatus according to the present embodiment executes a user program including a JTAG command submitting procedure. A variety of procedures of exclusive control are described below. The procedures of exclusive control are executed because the service processor 100 and a plurality of the processor units (cores) 1 may submit JTAG commands. That is, when a plurality of submitters submit JTAG commands at the same time, the JTAG command requests from one of the submitters is executed through exclusive control, and the JTAG command requests from the other submitters are kept waiting. In this way, malfunctions caused by simultaneous execution of multiple JTAG commands may be reduced if not prevented.

For simplicity, the terms "submission of 'ASI_CMD_RECEIVE_REG' instruction" and "submission of 'ASI_CMD_ACCESS_REG' instruction" are used. The term "submission of 'ASI_CMD_RECEIVE_REG' instruction" refers to submission of a load instruction of an ASI command while specifying the ASI space number and 5 bits of the lower 8 bits of the virtual address corresponding to "ASI_CMD_RECEIVE_REG". Through the load instruction, the data is delivered from the L2 cache control unit 30 to the target unit (the processor unit 1 in this example) via the load data unit 23 of the L1 cache control unit 20.

In addition, the term "submission of 'ASI_CMD_ACCESS_REG' instruction" refers to submission of a store instruction of an ASI command while specifying the ASI space number and 5 bits of the lower 8 bits of the virtual address corresponding to "ASI_CMD_ACCESS_REG". Through the store instruction, the data is delivered from the arithmetic unit 12 to the target unit (the L2 cache control unit 30 in this example) via the store data unit 22 of the L1 cache control unit 20.

Figure 7:
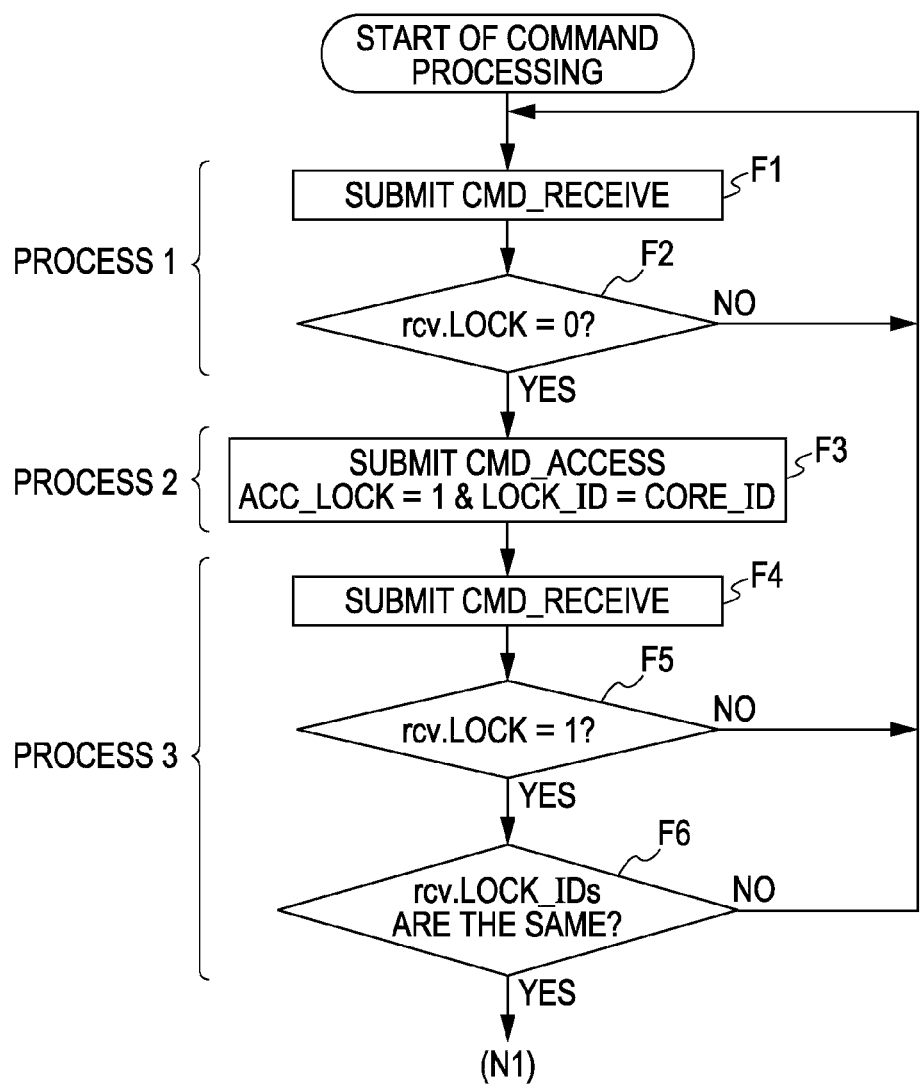
FIG. 7 is a flowchart of a command submission procedure.
Figure 8:
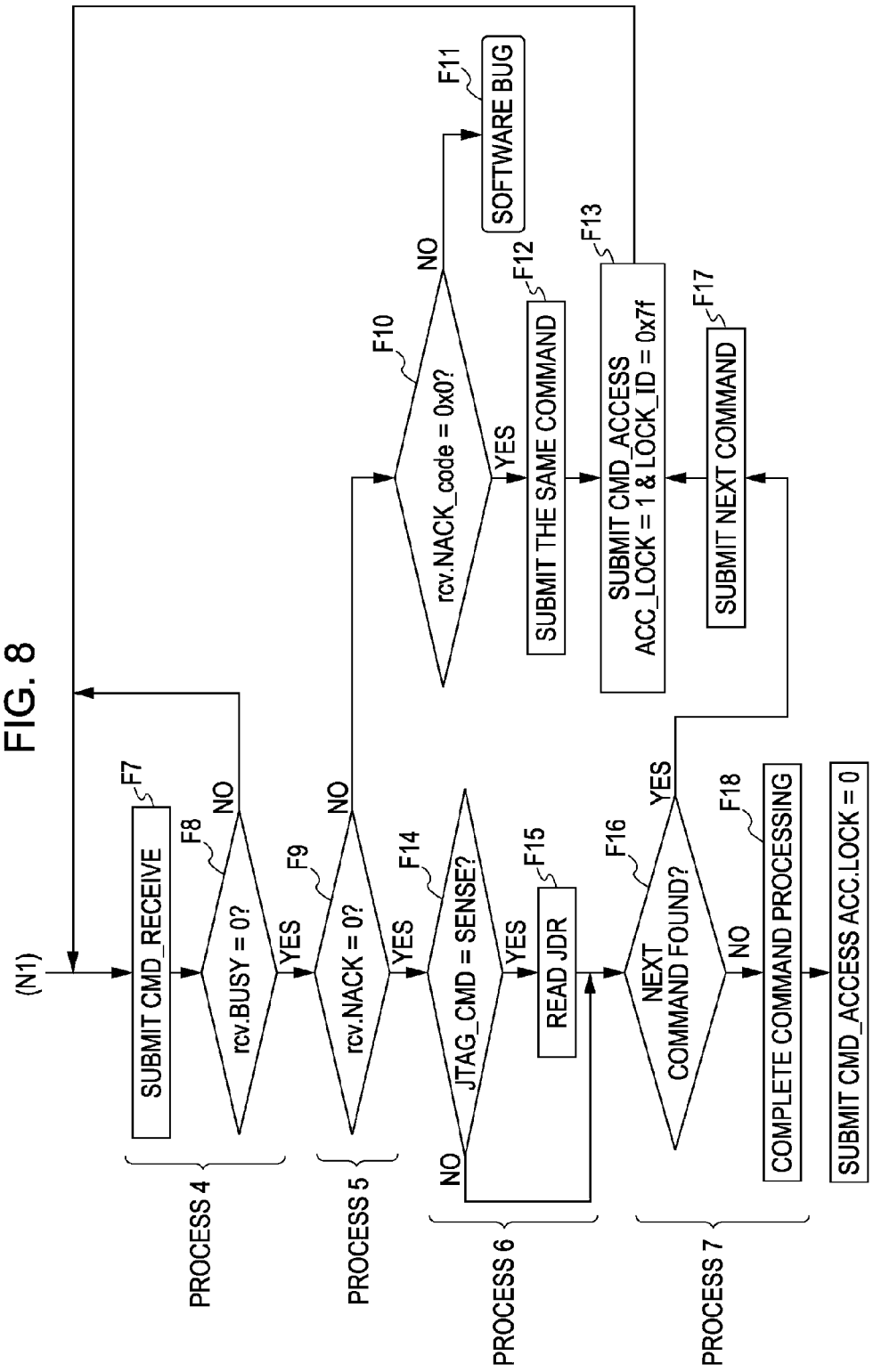
FIG. 8 is a flowchart of a command submission procedure.

These operations correspond to operations in which the "ASI_CMD_RECEIVE_REG" command and the "ASI_CMD_ACCESS_REG" command are executed by a user program. For example, a compiler that compiles a program executed by the processor unit 1 sets the command submission procedure in an executable binary program. FIGS. 7 and 8 are flowcharts of exemplary command submission procedures. Note that FIG. 8 is a continuation of FIG. 7, and the flowchart in FIG. 7 is connected to the flowchart in FIG. 8 using the reference symbol "N1".

Process 1

The processor unit 1 (e.g., the processor unit 1-1) submits an "ASI_CMD_RECEIVE_REG" command, reads the asi_cmd_receive_reg.LOCK bit (F1), and determines whether or not the readout value is "0" (F2). If the readout value is "0", execution of an ASI-command-based JTAG command is available. Accordingly, in the processor unit 1, the processing proceeds to F3 of a process 2, where the JTAG command is submitted.

However, if the readout value is not "0", a different processor unit (e.g., the processor unit 1-2) or the service processor 100 is executing a JTAG command. Accordingly, if the readout value is not "0", the processor unit 1 waits for completion of the JTAG command executed by the different processor unit or the service processor 100. Upon completion of the JTAG command executed by the different processor unit or the service processor 100, the processor unit 1 submits the JTAG command. Therefore, the processor unit 1 repeatedly submits the "ASI_CMD_RECEIVE_REG" instruction at specific intervals until the readout value is changed to "0". At that time, the processor unit 1 repeatedly reads the asi_cmd_receive_reg.LOCK bit. When the asi_cmd_receive_reg.LOCK bit is changed to "0", the processing performed by the processor unit 1 proceeds to F3 of the process 2.

Process 2

The processor unit 1 submits an "ASI_CMD_ACCESS_REG" instruction (F3). At that time, the processor unit 1 sets the asi_cmd_access_reg.LOCK bit to "1" and sets the asi_cmd_access_reg.LOCK_ID to a LOCK_ID that is unique to each of the processor units 1. In addition, the processor unit 1 sets the JTAG command to be executed in the asi_cmd_access_reg.JDR.

However, the processor unit 1 does not use a value "0x7f" as the unique number used for the LOCK_ID. As described below, the number "0x7f" indicates a special function. Accordingly, if the processor unit 1 uses the number "0x7f" as the unique number used for the LOCK_ID, a proper LOCK is not obtained and, therefore, a malfunction occurs.

Process 3

The processor unit 1 submits an "ASI_CMD_RECEIVE_REG" instruction (F4). The processor unit 1 determines whether the asi_cmd_access_reg.LOCK bit="1" (F5) and whether the asi_cmd_access_reg.LOCK_ID is equal to the asi_cmd_access_reg.LOCK_ID specified in F3 of the process 2 (F6). If the two conditions are satisfied, the execution right requested by the "ASI_CMD_ACCESS_REG" instruction submitted in F3 is granted to the processor unit 1 through exclusive control. Accordingly, the JTAG command is executed by the processor unit 1. If the two conditions are satisfied, that is, if "YES" in F5 and "YES" in F6, the processing of the processor unit 1 proceeds to F7 of a process 4.

However, if at least one of the two conditions is not satisfied, the execution right requested by the "ASI_CMD_ACCESS_REG" instruction submitted in F3 of the process 2 is not granted to the processor unit 1. Thus, the instruction is not executed. If the instruction is not executed, the processing of the processor unit 1 returns to F1 of the process 1.

Process 4

The processor unit 1 submits an "ASI_CMD_RECEIVE_REG" instruction (F7 in FIG. 8). The processor unit 1 determines whether asi_cmd_receive_reg.BUSY="0". If asi_cmd_receive_reg.BUSY="0" (YES in F8), the processing proceeds to F14 of a process 5.

However, if asi_CMD_receive_reg.BUSY="1" (No in F8), the JTAG command control unit 40 is still executing the JTAG command submitted in F3 of the process 2. In such a case, the processor unit 1 submits an "ASI_CMD_RECEIVE_REG" instruction again and repeats F7 until asi_cmd_receive_reg.BUSY="0".

Process 5

The processor unit 1 determines the value of asi_CMD_receive_reg.NACK (F9). If asi_cmd_receive_reg.NACK="1", the processor unit 1 determines the value of asi_cmd_receive_reg.NACK_code (F10). If asi_cmd_receive_reg.NACK="1" and NACK_code≠0x0, a software bug is detected (F11). In such a case, the software is desirably corrected.

However, if asi_cmd_receive_reg.NACK="1" and NACK_code=0x0, the ASI-command-based JTAG command is not executed since the JTAG command is deprived of the execution right by a JTAG command submitted by the service processor 100. In such a case, the processor unit 1 submits the JTAG command that was submitted in F3 of the process 2 again (F12). However, at that time, the ASI command has already acquired the exclusive control.

Accordingly, in order to indicate that the processor unit 1 that had acquired the lock submitted a JTAG command via a second or subsequent ASI command submission, the processor unit 1 sets the asi_cmd_access_reg.LOCK_ID to "0x7f". Thereafter, the processor unit 1 submits an "ASI_CMD_ACCESS_REG" instruction with asi_cmd_access_reg.LOCK set to "1" (F13). The processing then returns to F7 of the process 4. If asi_cmd_receive_reg.NACK="0", execution of the ASI-command-based JTAG command is successfully completed, and the processing of the processor unit 1 proceeds to the next process 6.

Process 6

The JTAG commands are categorized into the following two types: a SENSE command and a LOAD command.

The SENSE command is used for reading a state of a processing apparatus. The operation of reading the state of the processing apparatus is referred to as a "JTAG-SENSE operation". If the JTAG command submitted by the ASI command is a SENSE command (YES in F14), the processor unit 1 reads the value of asi_cmd_receive_reg.JDR (F15). After the reading operation is completed, the processor unit 1 completes the JTAG-SENSE operation triggered by the ASI command.

The LOAD command is used for changing the state of a processing apparatus or instructing the processing apparatus to perform some operation. The operation of changing the state of the processing apparatus or instructing the processing apparatus to perform some operation is referred to as a "JTAG-LOAD operation". If the JTAG command submitted by the ASI command is a LOAD command (No in F14), the state of the processing apparatus is changed by the LOAD command. Thereafter, the processor unit 1 completes the JTAG-LOAD operation. For example, by determining whether the processing is successfully completed as illustrated in F9, it may be determined whether the JTAG-LOAD operation is completed.

Process 7

When JTAG commands via a plurality of continuously submitted ASI commands from the processor unit 1 are executed (YES in F16), the processor unit 1 sets asi_cmd_access_reg.LOCK_ID to "0x7f". The processor unit 1 then submits an "ASI_CMD_ACCESS_REG" instruction with asi_cmd_access_reg.LOCK set to "1" (F17 and F13). Thereafter, the processing returns to F7 of the process 4.

In contrast, when a JTAG command is submitted using a single ASI command or when a JTAG command is submitted using the last ASI command of a plurality of ASI commands, the processing of the JTAG command has been completed through the process 6 (F14 and F15). Accordingly, the processor unit 1 sets the asi_cmd_access_reg.LOCK to 0 and submits an "ASI_CMD_ACCESS_REG" instruction. Thereafter, the processing returns to F7 of the process 4. Upon receiving this instruction, the processor unit 1 releases the exclusive control privilege for a JTAG command via an ASI command. In this way, the series of the JTAG command processes is completed (F18).

Through the above-described processes, an ASI-command-based JTAG command is executed. The asi_cmd_access_reg.JIR indicates which one of the JTAG commands is to be executed. This value is set when an "ASI_CMD_ACCESS_REG" instruction is submitted. The JTAG command acceptance determination unit 41 of the JTAG command control unit 40 refers to the value of JIR and determines whether the ASI command is to be executed or not. Since the JTAG command control unit 40 determines whether an ASI command is to be executed or not, JTAG commands available for users may be limited. For example, a table containing a list of the codes of JTAG commands available for the users may be set in a memory readable by the JTAG command acceptance determination unit 41. Alternatively, a table containing a list of the codes of JTAG commands unavailable for the users may be set in a memory readable by the JTAG command acceptance determination unit 41. The JTAG command acceptance determination unit 41 may refer to the list of the codes of JTAG commands available for the users in the memory and determine whether a JTAG command indicated by the value of JIR is one of the ASI-command-based JTAG commands having permission for execution. Alternatively, the JTAG command acceptance determination unit 41 may refer to the list of the codes of JTAG commands unavailable for the users in the memory and determine whether a JTAG command indicated by the value of JIR is one of the JTAG commands having permission for execution via an ASI command.

By setting a value in a register called OPSR (operation status register) that allows the operation setting of the hardware, a JTAG command may be made unavailable to users.

For debugging performed by hardware developers, more JTAG commands (all of the JTAG commands in some cases) may be available via an ASI command. For example, when hardware developers perform debugging, the JTAG command control unit 40 may allow users to use all of the JTAG commands by performing control so that the JTAG command acceptance determination unit 41 is not started.

Alternatively, a register containing a flag indicating that all of the ASI-command-based JTAG commands received via JIR are available for users may be provided in the JTAG command control unit 40. In addition, when hardware developers perform debugging, a flag may be set from outside the JTAG command control unit 40 so that all of the ASI-command-based JTAG commands received via JIR are available.

By setting a value in asi_cmd_access_reg.COREn/UNITm when an "ASI_CMD_ACCESS_REG" instruction is submitted, a user program may select a submission target of a JTAG command (e.g., one of the processor units (cores) 1 or one of the other units).

In addition, by setting a value in asi_cmd_access_reg.JDR when an "ASI_CMD_ACCESS_REG" instruction is submitted, the user program may set control information values to be written to the processing apparatus using the JTAG command.

By changing the setting values when an "ASI_CMD_ACCESS_REG" instruction is submitted, a user program may select the type of JTAG command and the operation of the JTAG command. As the result of execution of the JTAG command, the states of the internal units of the processing apparatus are read using an "ASI_CMD_RECEIVE_REG" instruction. In addition, the "ASI_CMD_RECEIVE_REG" instruction may be used for exclusive control among the processor units 1 (e.g., exclusive control between the processor unit 1-1 and the processor unit 1-2) and exclusive control between the processor unit and the service processor 100.

The procedure of submitting an ASI-command-based JTAG command has been described from the viewpoint of a user writing a program. When a user program is compiled, a compiler may integrate the procedure of submitting an ASI-command-based JTAG command into the user program. The hardware configuration of a processing apparatus that may submit an ASI-command-based JTAG command may be clearly known to the hardware developer. However, for confirmation, the following note regarding the hardware design of an exclusive control section is described. Upon receiving an "ASI_CMD_ACCESS_REG" instruction, the JTAG command control unit 40 determines whether the JTAG command is executable or not as follows. That is, whether the JTAG command is executable or not is determined by using the value of the LOCK bit before the "ASI_CMD_ACCESS_REG" instruction is received and the values of the LOCK bit and the LOCK_ID that the "ASI_CMD_ACCESS_REG" instruction specifies. In addition, the JTAG command control unit 40 updates the information regarding the LOCK bit, the LOCK_ID, and the BUSY/NACK after the JTAG command is executed.

FIG. 9 illustrates an example of the values set in the command data "ASI_CMD_ACCESS_REG" when a requester of execution of a JTAG command attempts to acquire a LOCK and release the acquired LOCK, and an example of a change in the state of the register "ASI_CMD_ACCESS_REG".

When the processor unit 1 (e.g., the processor unit 1-1) acquires a LOCK, the JTAG command control unit 40 updates the register rcv.LOCK_ID to the LOCK_ID assigned to the processor unit 1. In addition, when another processor unit (e.g., the processor unit 1-2) acquires a LOCK, the JTAG command control unit 40 updates the register rcv.LOCK_ID to the LOCK_ID assigned to the processor unit 1-2.

The operation for updating the LOCK_ID is described next with reference to FIG. 9. FIG. 9 illustrates the state of the register rcv.LOCK before a lock is acquired and released in the leftmost column. In this state, the processor unit 1 attempts to acquire and release the lock with the command data acc.LOCK and acc.LOCK_ID specified. Patterns of combinations of a register and a command at that time are illustrated in three columns under the heading "Before Execution".

In addition, in FIG. 9, three columns indicate the information in the registers rcv.LOCK, rcv.LOCK_ID, and rcv.BUSY/NACK after the operations of acquiring and releasing the lock. Furthermore, the column "command" under the heading "After Execution" indicates whether a JTAG command is to be executed or not. The operation and behavior are described next with reference to information in each row.

Note that the top three rows of the table illustrated in FIG. 9 are heading fields of the table. Accordingly, in the following description, the row number is counted with the top three rows that are surrounded by a bold frame excluded. For example, a "first row" of the table represents the fourth row from the top of the table in FIG. 9.

In the operation indicated by the first row illustrated in FIG. 9, a command with "command data acc.LOCK=0" is executed when the register rcv.LOCK=0. This operation indicates that a lock release operation (a write operation with "acc.LOCK=0") is performed when the lock is not locked (rcv.LOCK=0). This is a meaningless operation. After this command is executed, the JTAG command control unit 40 performs control so that the LOCK_ID is not changed during the unlock state (rcv.LOCK=0). In addition, the information regarding the execution result (rcv.BUSY/NACK) is not changed. Furthermore, the JTAG command specified at that time is not executed.

In the operation indicated by the second row illustrated in FIG. 9, a command with "command data acc.LOCK=1" is executed when the register rcv.LOCK=0. This operation indicates that a lock acquisition operation (a write operation with "acc.LOCK=1") is performed when the lock is not locked (rcv.LOCK=0). When the executed command acquires a lock, the JTAG command control unit 40 sets the register rcv.LOCK to "1" and replaces the value in the register rcv.LOCK_ID with the value specified in the command data acc.LOCK_ID. The JTAG command control unit 40 executes the JTAG command specified by the command data acc.JIR and sets the register rcv.BUSY/NACK so that rcv.BUSY/NACK=1/0. The value in the register rcv.BUSY is updated to "0" when the execution of the JTAG command is completed. The user program may determine whether the lock acquisition is successful or not by referring to the command data "ASI_CMD_RECEIVE_REG".

In the operation indicated by the third row illustrated in FIG. 9, a command with "command data acc.LOCK=0" is executed when the register rcv.LOCK=1. This operation indicates that a lock release operation (a write operation with "acc.LOCK=0") is performed when the lock is locked (rcv.LOCK=1). The number of the processor units 1 that have a lock is limited to one by the lock acquisition control. Accordingly, the release of a lock is always successful regardless of the value of acc.LOCK_ID. At that time, the JTAG command control unit 40 sets the value of rcv.LOCK to "0". In addition, the JTAG command control unit 40 replaces the value in the register rcv.LOCK_ID with the value in the command data acc.LOCK_ID. At that time, since the JTAG command is completed without being executed, rcv.BUSY/NACK=0/0.

In the operation indicated by the fourth and fifth rows illustrated in FIG. 9, a command with "command data acc.LOCK=1" is executed when the register rcv.LOCK=1. The operation indicated by the fourth row indicates that when lock requests sent from a plurality of requesters are in contention, only the requester that has received the lock first is permitted to execute the JTAG command. The operation indicated by the fifth row indicates that when the lock is locked (rev.LOCK=1), JTAG commands are continuously executed while maintaining the locked state (write operations with "acc.LOCK=1"). The operation in the fourth row is different from the operation in the fifth row in that the value in acc.LOCK_ID is not 0x7F (in the case of the fourth row) or that the value in acc.LOCK_ID is 0x7F (in the case of the fifth row) when the JTAG command is submitted.

In the operation indicated by the fourth row, the value in acc.LOCK_ID is not 0x7F. In such a case, after one of the requesters (e.g., the processor unit 1) acquires the lock and sets the LOCK_ID of the requester, the JTAG command control unit 40 receives a lock request from another requester. At that time, the JTAG command control unit 40 rejects the lock request from the other requester. Accordingly, the JTAG command control unit 40 does not change the rcv.LOCK_ID nor executes the JTAG command. In order to prevent the requester of the other lock request from interfering with the JTAG command in execution, the JTAG command control unit 40 does not update rcv.BUSY/NACK.

In the operation indicated by the fifth row illustrated in FIG. 9, the value of the command data acc.LOCK_ID is 0x7F. In this case, after one of the requesters acquires the lock and sets the LOCK_ID of the requester, the JTAG command control unit 40 continuously receives JTAG commands to be executed while maintaining the lock. At that time, the register rcv.LOCK_ID indicates the LOCK_ID of the requester. The JTAG command control unit 40 does not change the value in the register rcv.LOCK_ID and maintains the value. In addition, the JTAG command control unit 40 sets the values so that the register rcv.BUSY/NACK=1/0 and starts executing the JTAG command. In this way, the exclusive control is performed when a requester is a user program running in the processor unit 1.

In addition to the above-described exclusive control, exclusive control that prevents contention between execution of a JTAG command submitted from the processor unit 1 and a JTAG command submitted from the service processor 100 may be required. The exclusive control that prevents such contention is described next.

In order to prevent contention between a JTAG command submitted from the service processor 100 and an ASI-command-based JTAG command, control using a "JTAG_LOCK_SP_REG" is performed. In order to allow the JTAG command submitted from the service processor 100 to be executed between the executions of ASI-command-based JTAG commands, when the service processor 100 submits a JTAG command, a value is set in the "JTAG_LOCK_SP_REG" as follows:

(Procedure 1) The service processor 100 requests the JTAG command control unit 40 to set the register JTAG_LOCK_SP_REG to "1" using a LOAD command of JTAG;

(Procedure 2) If the JTAG command control unit 40 executes an ASI-command-based JTAG command, the JTAG command control unit 40 temporarily stops updating of JTA- G_LOCK_SP_REG. When the execution of the ASI command is completed, that is, when the value of asi_cmd_receive_reg.BUSY is changed from "1" to "0", the JTAG command control unit 40 sets JTAG_LOCK_SP_REG to "1".

During a time period of "JTAG_LOCK_SP_REG='1'", even when the JTAG command control unit 40 receives an ASI-command-based JTAG command, the JTAG command control unit 40 sets asi_cmd_receive_reg.NACK to "1". Thus, the JTAG command control unit 40 causes the execution of the ASI-command-based JTAG command to fail. Note that the processing performed by the processor unit 1 is illustrated in the process 5 of FIG. 7. By performing such control, the JTAG command control unit 40 prevents a new ASI command from being executed by the processor unit 1;

(Procedure 3) The service processor 100 submits a JTAG SENSE command and waits until the service processor 100 recognizes that JTAG_LOCK_SP_REG is set to "1".

(Procedure 4) After recognizing that JTAG_LOCK_SP_REG is set to "1", the service processor 100 executes the JTAG command to be executed (e.g., a LOAD command or a SENSE command); and (Procedure 5) After the execution of the JTAG command is completed, the service processor 100 sets JTAG_LOCK_SP_REG to "0" using a JTAG LOAD command.

The configuration that allows an ASI-command-based JTAG command to be submitted has been described. By using such a configuration and additionally providing the following mechanism, a performance analyzing (PA) function of a processing apparatus may be provided.

<Example of Performance Analyzing>

The information to be recorded in the history RAM may be acquired by each of the processor units 1 or each of the units, such as the L1 cache control unit 20 and the L2 cache control unit 30 for each of the cycles. In addition, by turning on a write signal for the history RAM when an event to be recorded occurs, the log of the occurrence of the event may be collected. According to the present embodiment, when a cache miss occurs in the L1 cache control unit 20, the following information is recorded: the address at which the cache miss occurs and information associated with the cache miss (e.g., load/store and some of the virtual addresses if the cache is based on a virtually indexed physically tagged (VIPT) method).

The processing apparatus submits an ASI-command-based JTAG command while a user program is being executed. Thus, the processing apparatus records the event in the history RAM. According to the present embodiment, a user program being executed when an event is recorded in the history RAM is referred to as an "analyzed program". In the present embodiment, a processing apparatus that executes an analyzed program further submits a JTAG command using an ASI command and reads the recorded log in the history RAM.

Subsequently, the processing apparatus executes a user program that analyzes the log read from the history RAM. The user program is referred to as an "analyzing program".

While an analyzed program is being executed, a log of an event, such as a cache miss, is collected a plurality of times. The processing apparatus executes an analyzing program and statistically processes the logs collected a plurality of times as a single log. Through such processing, the processing apparatus that executes the user analyzing program may identify the address at which a cache miss frequently occurs. More specifically, the following cases may be listed:

(1) The Case in which the Log of a Cache Miss is Unconditionally Collected

For example, a "cache miss" is specified as an event to be collected. However, other conditions are not specified. In this case, each time an event, such as a cache miss, occurs, an operation log is recorded in the history RAM. The processing apparatus (the analyzing program) records the events in the history RAM until the recorded operation log data exceeds the capacity of the history RAM and considers the recorded events as the collected log to be analyzed.

If the recorded operation log data exceeds the capacity of the history RAM, control is performed so that the oldest recorded data item is overwritten by the new data item to be recorded. Accordingly, the latest operation log data recorded in the entire capacity of the history RAM is analyzed. In such a case, the processing apparatus may combine the past operation log data collected when the same user program was executed with the latest recorded operation log data and may analyze the combined data.

(2) The Case in which Collection of the Log of a Cache Miss is Started when a Specific Condition is Satisfied The processing apparatus (the analyzing program) performs the same processing as that in the case in which the log of a cache miss is collected unconditionally.

(3) The Case in which Collection of the Log of a Cache Miss is Stopped when a Specific Condition is Satisfied When the processing apparatus executes a user program (an analyzed program) once, the operation log for one execution is collected. At that time, the processing apparatus (the analyzing program) analyzes the collected log for one execution. In such a case, the processing apparatus may combine the past operation log data collected when the same user program was executed with the latest recorded operation log data and may analyze the combined data.

The information to be recorded in the history RAM may be an operation log retrieved from the L1 cache in response to a request received from a different processor unit. In such a case, the address at which a cache miss occurred may be recorded together with the operation log retrieved from the L1 cache in response to a request received from a different processor unit.

An operation log retrieved from the L1 cache in response to a request received from a different processor unit may be recorded alone. As used herein, the term "alone" refers to excluding the log of accessing the L1 cache in response to a request from the processor unit itself. By collecting such information, the user may recognize whether an address that causes contention between the processor units 1 is present.

The types of information to be recorded in the history RAM may be selected using the registers defined by a JTAG command (e.g., registers CORE_DEBUG_REG0/1 and CHIP_DEBUG_REGn). According to the present embodiment, in the processing apparatus, these registers are selectable using an ASI-command-based JTAG command or a JTAG command submitted by the service processor 100.

For example, in the register CORE_DEBUG_REG0, a control condition for recording information in the history RAM 51 included in the instruction processing unit 11 and the type of a log to be recorded are specified.

In addition, for example, in the register CORE_DEBUG_REG1, a control condition for recording information in the history RAM 52 included in the L1 cache control unit 20 and the type of a log to be recorded are specified.

In addition, in the register CHIP_DEBUG_REGn, control conditions for recording information in the history RAMs 53 to 56 included in the L2 cache control unit 30, the external CPU interface 62, the memory interface 63, and the I/O interface 64 and the types of a log to be recorded are specified.

By setting appropriate values in the registers, the user may select specific log information and collect operation logs under the selected conditions.

For example, the value in the register CORE_DEBUG_REG0 is input to a history control unit that controls the history RAM 51 included in the instruction processing unit 11. The history control unit stops recording a log when detecting an operation code specified by the register CORE_DEBUG_REG0. At that time, a diagnose (DIAG) instruction is suitable for the specified operation code.

Actually, the DIAG instruction itself does nothing. However, information that the user desires may be stored in an unused field of the DIAG instruction. That is, the information that may be used for analysis may be stored in the unused field. An example of the unused field of the instruction is the operand portion of a direct specification format. As used herein, the term "direct specification format" refers to a specification format of an instruction operand that is not indirectly specified by a register.

Furthermore, in place of a DIAG instruction, a never-branch instruction (i.e., a branch instruction which will never branch) may be used in the same manner. Like the unused field of the DIAG instruction, the field of the never-branch instruction that contains a branch address may be used as an unused field.

The user may specify the point at which such an instruction is embedded by setting a stop point (e.g., a break point) in the source program displayed on a screen. After the stop point is determined in the source code by the user, the source code may be compiled by the compiler.

Accordingly, for example, when a compiler compiles a program including a stop point, the above-described instruction may be embedded at the break point. In such a case, when a plurality of DIAG instructions are embedded in the program (e.g., a file executable by the processor unit 1), a unique number may be assigned to each of the DIAG instructions. Thus, the unique number assigned to each of DIAG instructions may be used for identifying the DIAG instruction.

At that time, for example, the compiler sets a DIAG instruction having a unique number embedded therein in the register CORE_DEBUG_REG0 using an ASI-based JTAG command in the user program. The information regarding the DIAG instruction in the register CORE_DEBUG_REG0 is delivered to the history control unit of the history RAM 51. By using such information about the DIAG instruction, the history control unit stops recording a log in the history RAM 51 when a DIAG instruction having the unique number embedded therein is detected.

In this way, the user may instruct the processing apparatus to execute a program and stop recording a log in the history RAM 51 when the instruction located at a stop point is executed. That is, the user may select any point in the program as a stop point at which recording of a log is stopped.

However, the user may start recording a log in the history RAM 51 when a DIAG instruction having a unique number embedded therein is executed. A JTAG command set that functions in such a manner is defined, and a circuit of the history control unit that functions in such a manner is provided.

In addition to a log stop point (e.g., embedding the above-described command and specifying the command using a JTAG command), the user may embed, in a program, a point at which the log is read and a point at which recording of a log in the history RAM 51 is resumed. Accordingly, by simply running a program, the user may acquire a log at desired points in the program.

Furthermore, in addition to instructing such operations, the user may include an instruction to acquire a log of a cache miss as the type of event. By instructing acquisition of a log of a cache miss, the user may acquire an address log at which a cache miss occurred in a desired series of instructions.

Still furthermore, in addition to the log of a cache miss, the user may instruct acquisition of information regarding instruction execution, such as instruction addresses (equivalent to the values in a program counter) of an executed program serving as an executed instruction log, and a decoding state and the commitment state of an instruction. By instructing acquisition of such information, the user may view the log indicating how the desired series of instructions is executed.

In order to stop recording a log, the user may set a threshold value of a cache miss count. By using the threshold value of a cache miss count, the history control unit stops recording a log when a cache miss occurs a number of times greater than the threshold value for a specific period of time. In this way, the state of instruction execution and addresses at which a cache miss frequently occurred remain in a history RAM. Accordingly, by analyzing the information in the history RAM acquired after the user sets the threshold value of a cache miss count, the user may recognize at which location in the program cache miss frequently occurred.

An exemplary history recording control unit is described below. Here, an exemplary circuit configuration of a history control unit 52A that controls a recording method of the history RAM 52 included in the L1 cache control unit 20 and an exemplary circuit configuration of a register CORE_DEBUG_REG1 that holds a parameter delivered to the history control unit 52A are described.

Figure 10:
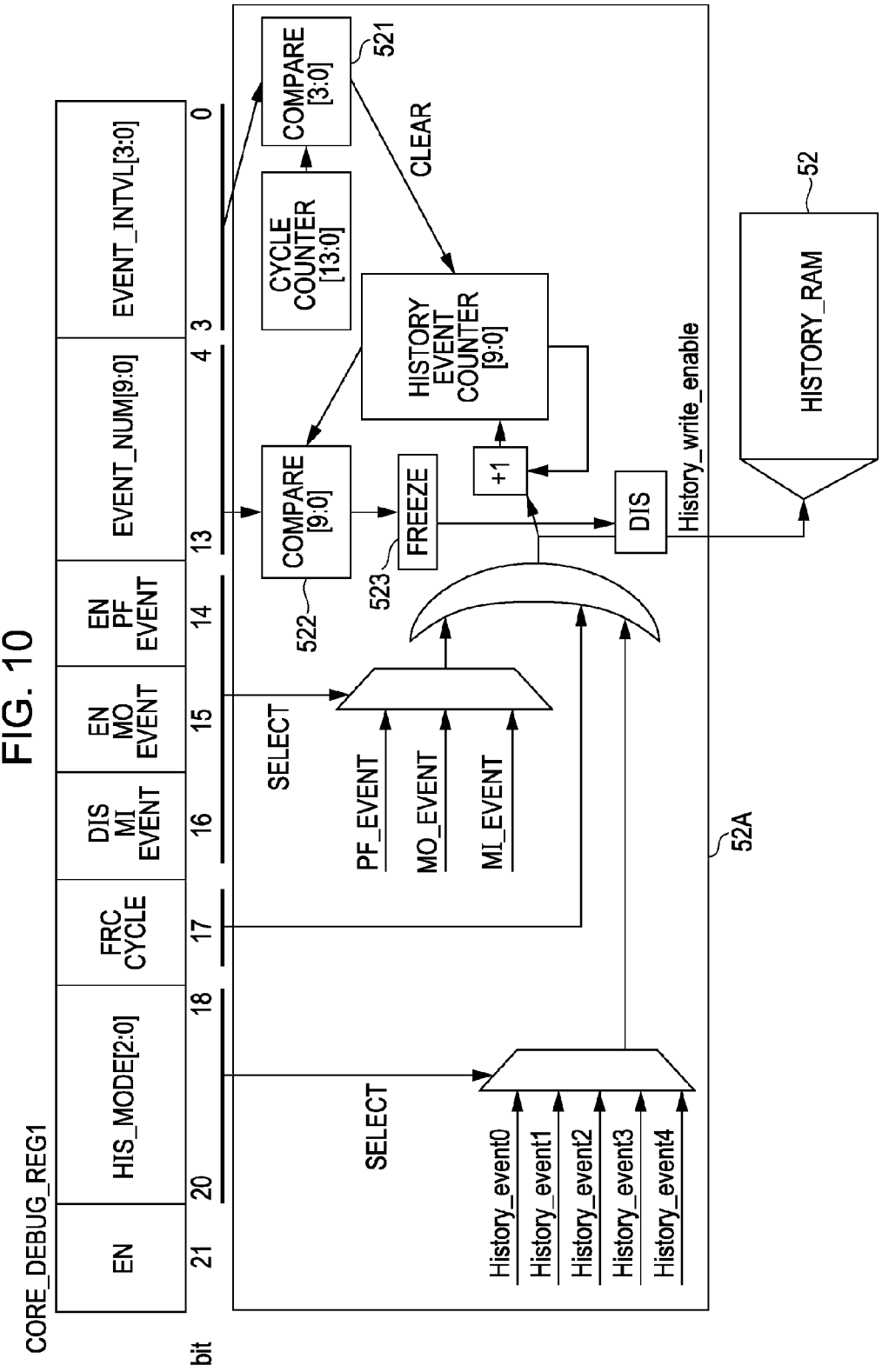
FIG. 10 illustrates a relationship between a history control unit of a history RAM included in an L1 cache control unit and the bit structure of a register CORE_DEBUG_REG1.

FIG. 10 illustrates a relationship between the history control unit 52A of the history RAM 52 included in the L1 cache control unit 20 and the bit structure of the register CORE_DEBUG_REG1. As illustrated in FIG. 10, the register CORE_DEBUG_REG1 has 22 bits from bit 0 through bit 21. By using each bit of the register CORE_DEBUG_REG1, recording of a log into the history RAM 52 performed by the L1 cache control unit 20 may be controlled. The processor unit 1 that executes a user program (an analyzed program) sets a value in the register CORE_DEBUG_REG1 using an ASI-based JTAG command.

The bit 21 (EN) of the register CORE_DEBUG_REG1 is used to control whether or not a clock is supplied to the history RAM 52. That is, the bit 21 is used to save the power when the history RAM 52 is not used. When the history RAM 52 is used, the processor unit 1 (the user program) sets the EN bit to "1" when the history RAM 52 is used. Note that a circuit for controlling clock supply corresponding to the bit 21 (EN) is not illustrated in FIG. 10. Such a circuit may be realized by an AND circuit having one input terminal receiving a clock and the other input terminal receiving the value of the bit 21 (EN).

When a plurality of types of events occurring in the L1 cache may be acquired, bits 20 through 18 (HIS_MODE[2:0]) are used for indicating which types of events are recorded. By indicating which types of events are recorded using the bits 20 through 18, a pipeline operation performed inside the L1 cache may be monitored. As illustrated in FIG. 10, HIS_MODE[2:0] may function as a selection signal for a selection circuit that selects data of a plurality of events (e.g., History_event0 to History_event4).

According to the present embodiment, for example, the processor unit 1 that executes a user program sets a cache thrashing detection mode in bits 20 through 18 (HIS_MODE [2:0]). In the thrashing detection mode, one of the following three events may be selected: registration of a new cache line in the L1 cache (a Move-In operation), output of a cache line from the L1 cache layer to the L2 cache layer (a Move-Out operation), and prefetch of a cache line into the L2 cache (a Prefetch operation). By setting the cache thrashing detection mode, a specified event is selected and recorded in the history RAM 52 when the specified event occurs.

Bit 17 (FRC_CYCLE) is used for controlling timing of recording an event. In a normal event log collection, a log is recorded in the history RAM when an event occurs. However, when Bit 17 (FRC_CYCLE) is set to "1", the history control unit 52A records an event for every cycle.

In order to observe thrashing, the history control unit 52A may perform control so that a time interval at which an event is recorded is also recorded in the log. Thus, the user may observe the time interval of cache misses, that is, the frequency of cache misses. By instructing event recording for every cycle, the user may observe an event indicating what happens between cache misses. When the user observes a pipeline operation performed by the L1 cache control unit 20, it may be more desirable that an operation log be recorded for every cycle by setting bit 17 (FRC_CYCLE) to "1" than for observing a log recorded each time an event regarding a pipeline occurs. The bit 17 (FRC_CYCLE) may be used in this manner.

Bit 16 (DIS_MI_EVENT), bit 15 (EN_MO_EVENT), and bit 14 (EN_PF_EVENT) are valid when the cache thrashing detection mode is activated. The default setting of these bits is 0. When all of these bits are set to "0", the Move-In operation is recorded in the cache thrashing detection mode. Normal thrashing may be detected by observing the Move-In operations.

If EN_MO_EVENT bit is set to 1, a Move-Out operation is also observed. If a Move-Out operation is recorded, the information recorded in the history RAM 52 may be used for detecting contention among the processor units 1 occurring when the processor units 1 access data. When the recording of the Move-In operations reduces the recording of the Move-Out operations and if this causes a problem, DIS_MI_EVENT is set to 1. This setting instructs that Move-In operations are preferably not recorded in the history RAM.

According to the present embodiment, the L1 cache and the L2 cache employ an inclusion method. In caching using an inclusion method, when the L1 cache is hit, the data effectively remains in the L2 cache. Accordingly, during program tuning, when the Move-In operation into the L1 cache is performed, it is expected that the L2 cache is hit. A Move-In operation into the L2 cache takes a relatively long time compared with the Move-In operation into the L1 cache. Accordingly, if the L2 cache is not hit during the Move-In operation into the L1 cache, the Move-In operation into the L2 cache is problematic. Accordingly, before the Move-In operation into the L1 cache is performed, a prefetch instruction that instructs a Move-In operation from a memory into the L2 cache is executed at an appropriate point of time.

The prefetch instruction is executed by the compiler. In order to determine whether the point of time at which the prefetch instruction is executed is appropriate, EN_PF_EVENT bit is set to 1. By setting EN_PF_EVENT bit to 1, the log information may be recorded for evaluating the points of time at which the Move-In operation and the Prefetch operation are performed.

Bit 16 (DIS_MI_EVENT), bit 15 (EN_MO_EVENT), and bit 14 (EN_PF_EVENT) each function as a selection signal for controlling collection of events in the lower level. The selection signal is input to a selection circuit that selects one of the event data items regarding ML_EVENT, MO_EVENT, and PF_EVENT.

Bits 13 through 4 (EVENT_NUM[9:0]) and bits 3 through 0 (EVENT_INTVL[3:0]) are used to stop recording a log when the number of events occurring within a specified period of time exceeds a specified count. To observe the number of occurrences of events, a counter HISTORY_EVENT_COUNTER[9:0] is provided. The counter is incremented by one each time an event log is recorded.

In addition to the counter HISTORY_EVENT_COUNTER[9:0], a counter CYCLE_COUNTER[13:0] is provided. The counter is incremented by one for each cycle regardless of the occurrence of an event. Furthermore, a comparator circuit 521 (COMPARE[3:0]) that detects coincidence between bits 13 through 10 of CYCLE_COUNTER [13:0] and EVENT_INTVL[3:0] is provided. If the comparator circuit 521 detects the coincidence, control is performed so that HISTORY_EVENT_COUNTER[9:0] is cleared to zero.

In this way, the count value in HISTORY_EVENT_COUNTER[9:0] is cleared at cycle intervals 1024 times the value specified in EVENT_INTVL[3:0]. HISTORY_EVENT_COUNTER[9:0] is connected to a comparator circuit 522 (COMPARE[9:0]) that compares HISTORY_EVENT_COUNTER[9:0] with EVENT_NUM[9:0]. If HISTORY_EVENT_COUNTER[9:0] is equal to EVENT_NUM[9:0], the comparator circuit 522 sets a FREEZE latch 523. If a FREEZE latch 523 is set, the output signal of the FREEZE latch 523 instructs to stop recording a log in the history RAM 52. Accordingly, when the FREEZE latch 523 is set, the subsequent recording of a log in the history RAM 52 is stopped.

If the number of events occurring within a period of time specified in EVENT_INTVL exceeds a count specified in EVENT_NUM, recording of a log in the history RAM is immediately stopped. In this way, when a cache miss is selected as an event for which a log is collected and if a cache miss occurs a number of times greater than a specific number within a specific period of time, the log collection is stopped. If a cache miss occurs a number of times greater than a specific number within a specific period of time, the user may consider that a cache miss frequently occurs. Thus, the user may collect a log at a time point when a cache miss frequently occurs.

Note that in order to prepare for the next log collection, the FREEZE latch 523 is reset when readout of the log by the user program is completed. In addition, for example, when EVENT_NUM is set to all zeros, the history control unit 52A performs control so that the FREEZE latch 523 is not set to 1. By performing such control, the history control unit 52A prepares for log collection performed when it is not necessary to stop log collection due to the number of the occurrences of an event.

Figure 11:
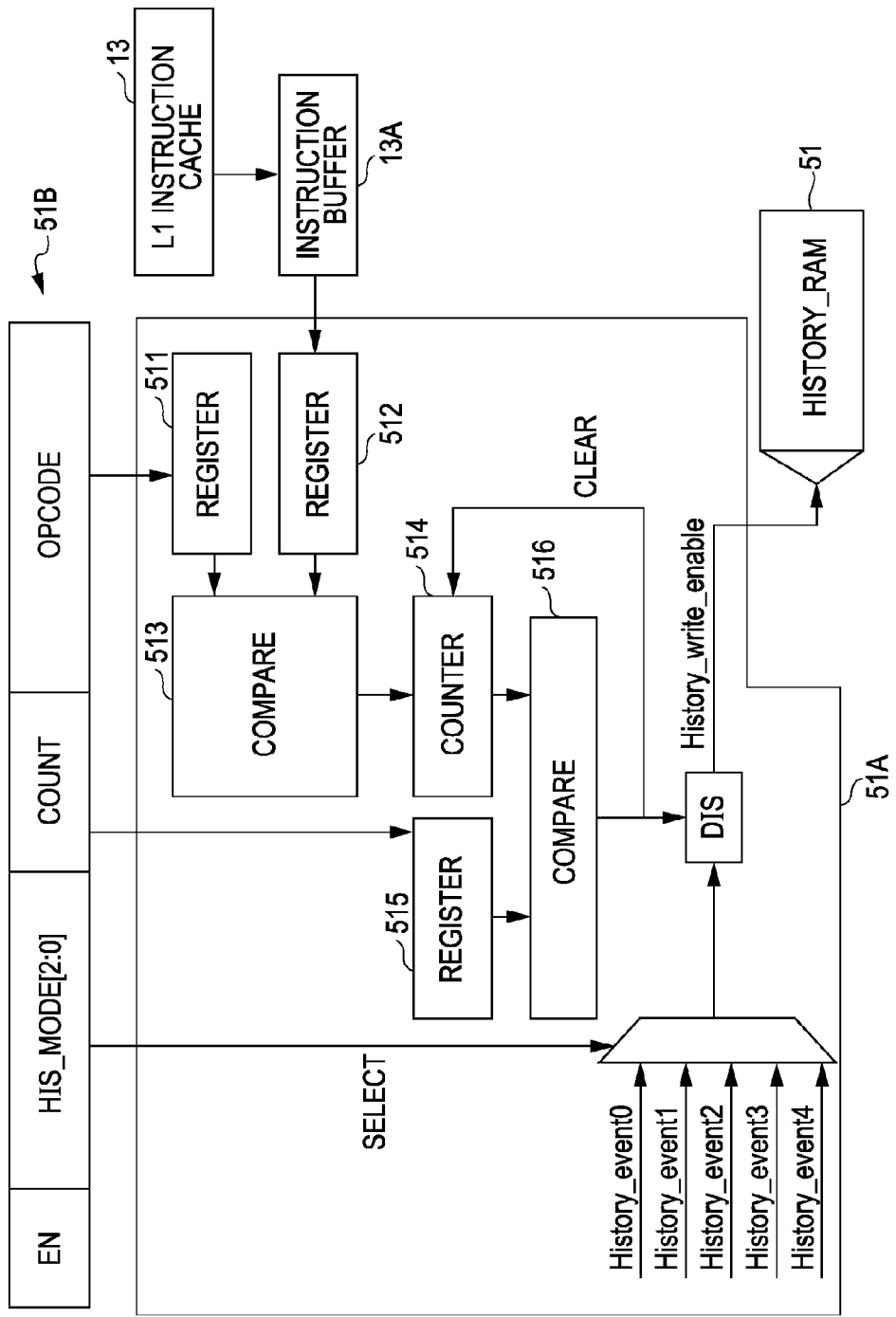
FIG. 11 is a schematic illustration of a relationship between a history control unit in a history RAM of a instruction processing unit and a control register that contains information for controlling the history control unit.

FIG. 11 is a schematic illustration of a relationship between the history control unit 51A in the history RAM 51 of the instruction processing unit 11 and a register CORE_DEBUG_REG0 51B that contains information for controlling the history control unit 51A.

As illustrated in FIG. 11, the register CORE_DEBUG_REG0 51B includes fields: EN (control of whether a clock is supplied or not), HIS_MODE[2:0] (a history mode), COUNT (the number of events), and OPCODE (an operation code). The usage of EN and HIS_MODE[2:0] is the same as that in FIG. 10. OPCODE contains an operation code to be observed together with the event specified in HIS_MODE[2:0]. COUNT contains the number of the occurrences of the specified operation code.

As illustrated in FIG. 11, the bit pattern of OPCODE of the register CORE_DEBUG_REG0 51B is stored in a register 511. In addition, an operation code that is processed by the instruction processing unit 11 via the L1 instruction cache 13 and an instruction buffer 13A is set in a register 512. A comparator 513 compares the bit pattern of the register 511 with the bit pattern of the register 512. If the bit patterns are the same, a counter 514 is incremented by one.

In addition, COUNT of the register CORE_DEBUG_REG0 51B is stored in a register 515. A comparator 516 compares the value in the counter 514 with the value in the register 515. If the two values are the same, the comparator 516 stops writing a log into the history RAM 51. In addition, the comparator 516 clears the counter 514. In this way, an event selected using HIS_MODE[2:0] (a history mode) is recorded until the operation code selected using OPCODE is detected a number of times indicated by COUNT.

When COUNT is set to 0, control is performed so that recording of a log in the history RAM 51 is stopped until a DIAG instruction is detected. After a DIAG instruction is detected, the value in the counter 514 is different from the value in the register 515. From that point of time, control is performed so that recording of a log in the history RAM 51 is resumed after the DIAG instruction is detected. Thus, the location at which the DIAG instruction is embedded serves as a start point from which collection of the event is started.

In this way, an event occurring in the instruction processing unit 11 may be recorded in the history RAM in association with the number of executions of a specified instruction. In such a case, by using, for example, a DIAG instruction including identification information in an unused field thereof as an operation code indicated by OPCODE, the user may observe the specified event occurring in the vicinity of the desired stop point or a specified start point.

In the foregoing description, the number of executions of the instruction specified in OPCODE serves as a condition for recording an event. However, the number of executions may be set to 1. In such a case, the presence or absence of the instruction specified in OPCODE serves as a condition for recording an event.

Alternatively, as illustrated in FIG. 11, without using the counter 514, the history control unit may stop or start writing a log in the history RAM 51 in accordance with the presence or absence of the instruction specified in OPCODE. In such a case, the user may acquire the log of an event for which recording is started or stopped in the vicinity of the point at which a desired instruction is executed.

FIGS. 10 and 11 illustrate exemplary processing performed by the history control units 52A and 51A using the history RAM 52 of the L1 cache control unit 20 and the history RAM 51 of the instruction processing unit 11, respectively. However, log control specified by an ASI command in the processing apparatus is not limited to the examples illustrated in FIGS. 10 and 11. A variety of functions of the JTAG command control unit 40 of the processing apparatus are available to a user program if the functions are able to be set using an ASI command. For example, the logs recorded in the history RAMs 53 to 56 may be acquired by the user program in the same manner.

Figure 12:
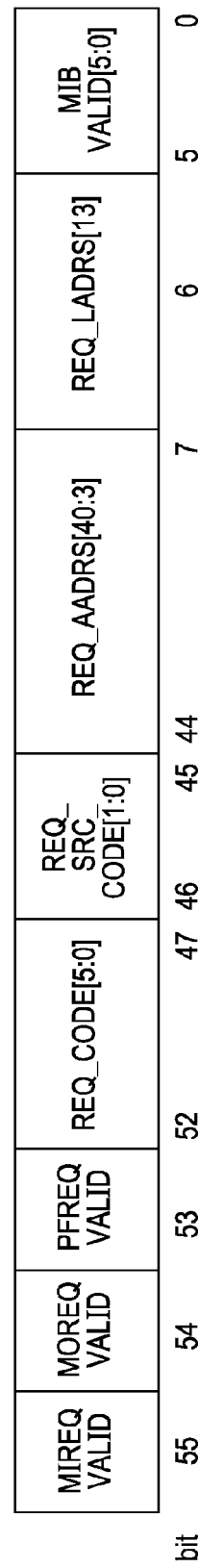
FIG. 12 illustrates an exemplary format of data recorded in a history RAM of the L1 cache control unit.

FIG. 12 illustrates an exemplary format of data recorded in the history RAM 52 of the L1 cache control unit 20. The definition of each bit illustrated in FIG. 12 is described below. As illustrated in FIG. 12, the history RAM 52 records data including the following fields: MIREQ_VALID, MOREQ_VALID, PFREQ_VALID, REQ_CODE[5:0], REQ_SRC_CODE[1:0], REQ_AADRS[40:3], REQ_LADRS[13], and MIB_VALID[5:0].

The field MIREQ_VALID indicates that a Move-In Request was sent due to a cache miss.

The field MOREQ_VALID indicates that a Move-Out Request was sent in response to an instruction from the L2 cache.

The field PFREQ_VALID indicates that a prefetch request was sent.

The value in the field REQ_CODE[5:0] indicates whether the request type is Move-In Request (MIREQ_VALID), Move-Out Request (MOREQ_VALID), or Prefetch Request (PFREQ_VALID).

The value in the field REQ_SRC_CODE[1:0] represents a requester of the MIREQ_VALID or PFREQ_VALID. For example, the code indicates one of the control units in the processing apparatus, such as the processor unit 1 (the user program) or a branch prediction mechanism.

The value in the field REQ_AADRS[40:3] represents a physical address of the target of the MIREQ_VALID, MOREQ_VALID, or PFREQ_VALID.

The value in the field REQ_LADRS[13] represents a logical address of the target of the MIREQ_VALID, MOREQ_VALID, or PFREQ_VALID.

Note that since bits[12:0] of the logical address is the same as the physical address, bits[12:0] are not recorded. In addition, for example, the upper 7 bits [13:7] of the logical address serves as an index address of the cache.

The value in the field MIB_VALID[5:0] serves as a flag for each buffer. The flag indicates that Move-In-Buffer of the requester of MIREQ_VALID is enabled.

Although not illustrated in FIG. 12, a field (INTERVAL) that indicates a log recording interval using the number of core cycles may be included in the data format. By computing the number of events for each of the core cycles using the log recording interval, the frequency of the occurrence of the event may be obtained.

A log is recorded in the history RAM functioning as a ring buffer in a wrap-around manner. Accordingly, if the number of events recorded in the history RAM is significantly small, the log previously collected remains in the log currently collected. Therefore, the user may receive the same log twice. In order to prevent the duplicated acquisition, the history control units 51A and 52A may start collecting a log after clearing the stored log, for example.

For simplicity, according to the present embodiment, after the history control units 51A and 52A records a specific bit pattern in the history RAM once, the history control units 51A and 52A start collecting a log. For example, a pattern in which a specific number of 0s are continuously arranged (hereinafter referred to as "identification information") may be used as the bit pattern recorded in the history RAM.

Figure 13:
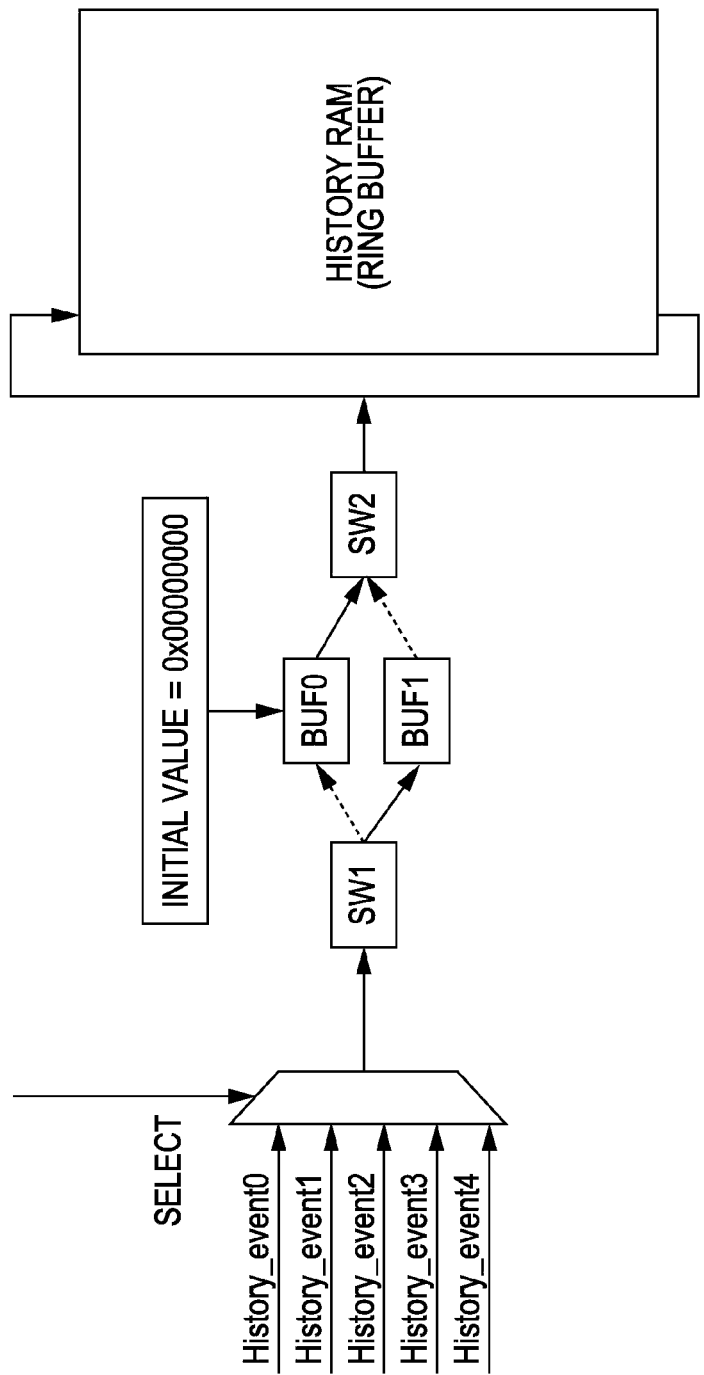
FIG. 13 illustrates a circuit that embeds identification information in the history RAM when log recording is started.

FIG. 13 illustrates an exemplary configuration of a circuit that embeds identification information in the history RAM when log recording is started. In FIG. 13, the configuration of a circuit that selects one of a plurality of types of events (the type of event indicated by signals history_event0 to history_event4) and writes a log into the history RAM is illustrated in detail. As illustrated in FIG. 13, two buffers BUF0 and BUF1 are provided. Each of the buffers BUF0 and BUF1 temporarily stores data that is to be recorded in the history RAM and that has data of one event.

An event selected by the selection signal is alternately stored in the buffers BUF0 and BUF1 using a switch SW1. In addition, the event is written, to the history RAM, from the buffer to which the event is not currently being written or the event has already been written. That is, the buffers BUF0 and BUF1 form two-plane buffers.

In such a configuration, a pattern in which a specific number of 0s are continuously arranged is prestored in the buffer BUF0. In addition, when a log collection is started, a first event is recorded in the buffer BUF1 selected by the switch SW1. While the first event is being recorded, the identification information in the buffer BUF0 is written to the history RAM via a switch SW2. Thereafter, each time an event is acquired, the buffers are switched, and events are sequentially stored in the history RAM. In this way, the identification information is embedded when log recording is started.

In the history RAM 52, a pattern including a specific number of continuous 0s indicates that MIREQ_VALID, MOREQ_VALID, and PFREQ_VALID of the bits used for indicating that a log recording event occurs are zeros. Accordingly, as the pattern of the identification information, a data pattern that does not remain in a log is recorded when a mode in which an operation log is to be recorded when an event occurs is specified. If the pattern of the identification information is not found in the log, the user may determine that all information recorded in the acquired log is the latest information. However, if some of the patterns of the identification information are found, the user may acquire the latest log information by running a tool that outputs a difference between the current log and the previous log in the processing apparatus.

While the foregoing description has been made with reference to the circuit configuration in which the identification information is stored in one of the two-plane buffers as an initial value, the configuration circuit that embeds the identification information when log recording is started is not limited thereto. For example, the input port of the history RAM may include a two-input port AND gate. The acquired log may be input to the first input port of the AND gate, and a bit pattern of 0s may be input to the second input port only when log recording is started. After a first event is recorded, "1" may be input to the second input port. In this case, when a first event occurs, the pattern of the identification information is recorded in the history RAM first. Accordingly, the first event is not recorded. However, the identification information is recorded in the history RAM in a simplified manner. In the case in which the log in the history RAM is statistically analyzed, the analysis is not affected even when the first event is not recorded.

Processing Performed by Analyzing Program

The log information acquired by the above-described hardware is delivered to a user program running under an operating system (OS). In this example, the log information is acquired by the analyzed program and is accumulated in a file stored in an external storage unit of the processing apparatus. Thereafter, the processing apparatus executes an analyzing program and analyzes the log information in the file. The processing of a cache miss address log performed by a user program (e.g., a performance analyzing program) executed by the processing apparatus is described below.

Figure 14:
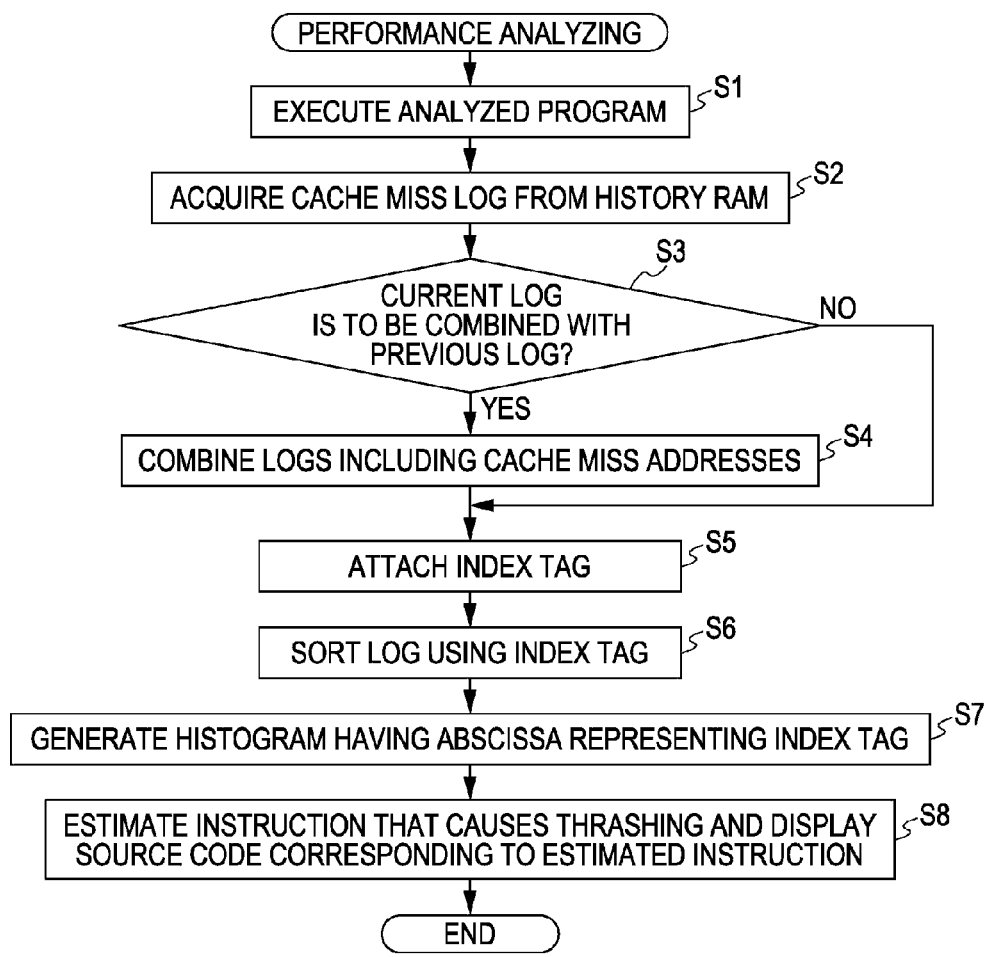
FIG. 14 illustrates the processing performed by a user program executed by the processing apparatus.

FIG. 14 illustrates the processing performed by a user program executed by the processor unit 1 of a processing apparatus (hereinafter simply referred to as a "processing apparatus"). The processing in S1 and S2 is performed by the analyzed program. In contrast, the processing in S3 to S8 is performed by the analyzing program.

When the analyzed program is compiled, the following two ASI commands are embedded: an "ASI_CMD_ACCESS_REG" command and an "ASI_CMD_RECEIVE_REG" command.

First, the processing apparatus executes the analyzed program (S1). By executing the analyzed program, a variety of events (e.g., information regarding a Move-In operation including an address at which a cache miss occurs) are recorded. When the execution of the analyzed program is completed, the processing apparatus acquires an operation log through an "ASI_CMD_RECEIVE_REG" instruction in the analyzed program. In this example, the operation log includes a cache miss address. The acquired operation log is stored in, for example, a log file used during the execution of the analyzed program (S2).

According to the present embodiment, the history RAM contains 32 bit×1024 operation logs (e.g., 1024 addresses at which cache misses occurred) as a set. The JTAG command control unit 40 delivers the operation log contained in the history RAM to the processing apparatus, that is, the execution environment of the analyzed program executed by the processing apparatus.

When the processing apparatus according to the present embodiment executes an "ASI_CMD_RECEIVE_REG" command, the processing apparatus acquires the value of the history RAM through the 32-bit area of JDR[0:31]. Accordingly, the processing apparatus performs a read operation via JDR[0:31] 1024 times. Thus, the processing apparatus acquires the 32 bit×1024 operation logs.

The operation logs read at that time may be logs of events occurring in a short time when the processing apparatus executes the analyzed program, for example, logs of an event frequently occurring within several minutes to several hours. Alternatively, the operation logs may be 1024 logs of events occurring for a long time when the processing apparatus executes the analyzed program, for example, for within several days to several months.

Subsequently, the processing apparatus asks the user whether the currently acquired log is to be combined with the previously acquired log (S3). The term "previously acquired log" refers to a log acquired when the processing apparatus executes the analyzed program that is the same as the analyzed program executed in S1.

If the user replies that the logs are to be combined, the processing apparatus, in response to the reply, combines the log acquired in S2 with the previously acquired log and stores the combined log in a file (S4). In this way, the processing apparatus generates a combined log serving as a larger cache miss address log. However, if the user replies that the logs are not combined, the processing performed by the processing apparatus proceeds to S5 in response to the reply.

The combined log includes addresses at which a cache miss occurred. In order to analyze thrashing occurring in a cache, the processing apparatus attaches an index tag rounded to the cache index address to each of the cache addresses (S5).

The term "rounding an index tag to a cache index address" refers to retrieving an address section used for cache search. In this example, the L1 cache control unit 20 manages a two-way set associative cache memory having a capacity of 32 KB using a line size of 128 bytes. At that time, the cache capacity per way is 16 KB. Since the line size is 128 bytes, 128 (16 KB/128 B) cache lines may be contained in the 16-KB cache. To index 128 cache lines, 7 bits are required in a binary form. Since the addresses in a line are not used for the indices of the cache line, the most significant bits are used for the cache index addresses excluding the addresses in the cache line.

For example, when the address remaining in the cache miss log is 0xffffffff8, the index tag is 0x00003f80. The least significant 7 bits "0000000" are the same as the address section in the cache line. Since this address section is not recognized as a cache index address, all the bits are 0. In addition, the next 7 bits "1111111" serves as a bit portion for identifying a cache index address. By performing such an operation on each of the addresses contained in the combined log and attaching an index tag, a combined cache miss log including the cache index address information may be generated.

Subsequently, the processing apparatus sorts the combined cache miss log in an ascending order or a descending order of the index tag (S6). At that time, a plurality of the same index addresses are continuously listed.

In addition, using the sorting result, the processing apparatus counts the number of the same cache index addresses and generates a histogram (S7). By generating the histogram, the cache index addresses at which a cache miss frequently occurred may be visualized for the user. In this case, the processing apparatus may display the histogram on a display unit.

If the histogram forms a smooth line, thrashing does not occur. However, if the histogram forms a line having a significant peak, thrashing occurred at the cache index address indicated by the peak point. By viewing the cache index address at which thrashing occurred, the user may determine that thrashing occurred at the cache miss address that frequently appears in the combined log.

Accordingly, for example, the processing apparatus may search the change rate of the histogram and the height of a peak in a direction in which the index tag changes. The processing apparatus may then determine that thrashing occurred at the location of the index tag at which at least one of the change rate of the histogram and the height of the peak exceeds a specific reference value. In addition, the processing apparatus may display the sequence of instructions assigned to the address and the source code corresponding to the instructions on the display unit (S8).

Furthermore, the core cycle in which a cache miss occurred may be recorded in the history RAM together with the address at which the cache miss occurred. The processing apparatus may generate a histogram of the number of occurrences of cache miss per unit time. The processing apparatus may search the height of a peak of the histogram in a direction in which the index tag is changed.

In this way, the processing apparatus may detect the position of the index tag at which the number of occurrences of cache miss exceeds a specific reference value and determine that the position of the detected index tag is the address at which thrashing occurs.

At that time, the processing apparatus examines the source code of the program in order to identify which instruction in the program corresponds to the instruction that submits a load/store address corresponding to the readout address. If the load/store instruction that causes the thrashing is identified, the thrashing may be eliminated by shifting the data area used by the instruction by several cache lines. For example, a compiler option for shifting data area assignment by specific addresses may be provided to the compiler. In order to determine whether the thrashing is reduced or eliminated, as expected, by changing the position at which the data area is assigned, the processing apparatus may execute the analyzed program again and acquire a cache miss log again. By examining a combined log, the user may determine whether the thrashing is reduced or eliminated.

Figure 15:
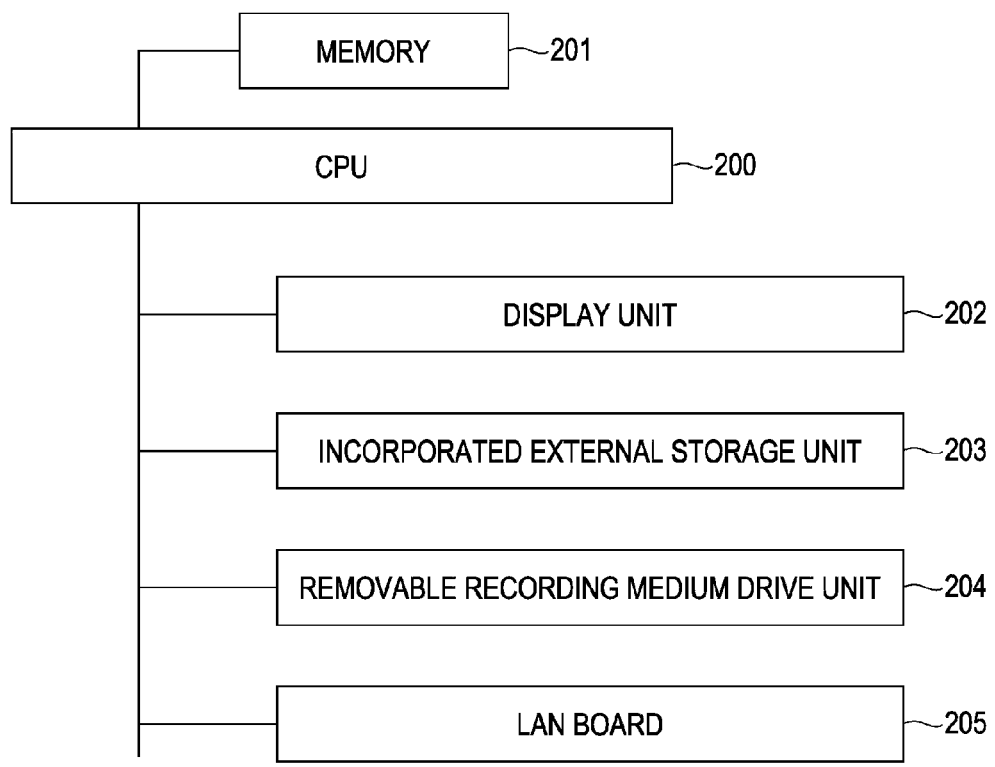
FIG. 15 illustrates a computer that executes a user program.

FIG. 15 illustrates an exemplary configuration of a computer that executes a user program (e.g., an application program including an analyzing program and an analyzed program). As illustrated in FIG. 15, the computer includes a CPU 200 which corresponds to the processing apparatus, a memory 201 connected to the CPU 200 via a memory interface, and a peripheral unit connected to the CPU 200 via an I/O interface. Examples of peripheral units include a display unit 202, an incorporated external storage unit 203, a removable recording medium drive unit 204, and a LAN board 205. Examples of the memory 201 include a dynamic random access memory (DRAM), a read only memory (ROM), and a flash memory. A program executed by the CPU 200 and data processed by the CPU 200 are stored in the memory 201. As illustrated in FIG. 14, examples of a program include a user program, a compiler, and a system program, such as an operating system (OS).

The display unit 202 displays the processing result of the computer. An example of the incorporated external storage unit 203 is a hard disk drive. The incorporated external storage unit 203 stores, for example, the user program, the compiler, and the OS which are to be loaded into the memory 201.

Examples of the removable recording medium drive unit 204 include a blu-ray disc, a digital versatile disk (DVD), a compact disc (CD), and a flash memory card. For example, a variety of programs are installed from the removable recording medium drive unit 204 or the LAN board 205 into the incorporated external storage unit 203 of the computer.

According to the present embodiment, the processing apparatus provides some of the functions of the service processor 100 to users by providing an instruction set defined by the SPARC-V9 instruction set called ASI commands described in the foregoing examples. Thus, the user may use the function of the service processor 100 and, therefore, the user may control recording of a log through a user program.

In addition, according to the present embodiment, the processing apparatus provides an interface for reading the information stored in the history RAM into a user environment. Such an interface allows controlling to write a JTAG command into the JTAG command control unit 40 using the ASI command. Such control allows the user to use some of the JTAG commands through a user program. The JTAG commands available for the users do not include a critical JTAG command that may cause a system halt.

By using such configuration, the user may monitor what happens inside the processing apparatus from the user computer environment. That is, the user may select a point that the user wants to monitor from the user computer environment. For example, the points that the user wants to monitor include the type of an event to be collected, such as a cache miss, and the location in the program executed by the processing apparatus when the event occurs.

In addition, the user may specify a condition when the user observes the point. For example, the conditions include the number of occurrences of the specified event, the frequency of the occurrences of the specified event, and execution of a particular instruction. In addition, the conditions include a condition for starting recording, a condition for collecting an event, a condition for stopping recording, and a condition for stopping collecting an event.

For example, the user may use a logging stop function with an operation code using a JTAG command available to users. Accordingly, the user may embed, as DIAG instructions, a branch-never instruction and a special instruction having an identification ID embedded in an unused field thereof in a sequence of instructions that the user wants to monitor. By setting such a special instruction as a logging stop instruction, the user may specify a point at which logging is stopped (i.e., an address of the program) from the user computer environment.

Furthermore, according to the present embodiment, the processing apparatus includes an interface through which the user may specify the value of a program counter of a point that the user wants to monitor and specify the number of times the program counter has that value at which the state is to be monitored.

Still furthermore, according to the present embodiment, the processing apparatus allows users to use JTAG commands for executing particular functions, such as a logging operation. Accordingly, the users may safely use the JTAG commands.

Yet still furthermore, according to the present embodiment, the "ASI_CMD_RECEIVE_REG" command and "ASI_CMD_ACCESS_REG" command are defined using the L2-ASI command for accessing a new ASI space. Since a new ASI space is used, the users need not take into account interference with existing registers in an existing memory space or the addresses assigned to existing devices. In addition, since an L2-ASI command is delivered to the L2 cache control unit by the L2-ASI instruction detecting unit 21, data that is input and output from and to the cache memory, such as the L1 operand cache 14, may be prevented from remaining in the L1 cache control unit 20. Thus, the data may be delivered from the ASI instruction interpreting unit 31 of the L2 cache control unit 30 to the JTAG command control unit 40.

Third Embodiment

According to the second embodiment, a processing apparatus uses JTAG resources using an ASI command. However, the configuration of the processing apparatus is not limited to that illustrated in FIG. 2. For example, a general CPU does not always have an ASI command. However, by using a particular or general command that a general CPU has, a mechanism that is the same as the mechanisms illustrated in the first and second embodiments may be provided. A mechanism for using a JTAG command in an instruction set other than the ASI commands is described below.

Note that, in the third embodiment, the configuration and operations other than those for using a JTAG command through an instruction set other than the ASI commands are the same as those of the first and second embodiments. Accordingly, the same numbering is used for the same elements of the configurations, and the descriptions thereof are not repeated. In addition, the configuration other than the configuration regarding the processing of an ASI command as illustrated in the drawings of the first and second embodiments may be similarly applied to the third embodiment.

Another method that may be widely used is described below. For example, among instructions provided by many currently-used CPUs, an access instruction for accessing a non-cache space may be used. The term "non-cache space" refers to a memory space that may be accessed without using a cache memory. An access instruction for accessing a non-cache space (hereinafter referred to as a "non-cache instruction") accesses a device without using a cache. The access to a non-cache space by a non-cache instruction is defined as a data read/write operation from and to an address space defined as a non-cache space. The operation to access a non-cache space is used for reading and writing data from and to a register or instructing the operation of an I/O unit.

In contrast, a normal load/store instruction (hereinafter referred to as a "cacheable instruction") accesses, for example, a physical memory via a cache. A memory space that is accessed via a cache is referred to as a "cacheable space". Examples of the cache include the L1 operand cache 14 and the L2 cache data unit 61 illustrated in FIG. 2. In the third embodiment, the non-cache space corresponds to a first address space.

Data input and output from and to a physical memory by an access instruction for accessing a non-cache space is directly input and output from and to the physical memory without using a cache. Accordingly, the access instruction to a non-cache space is suitable for an interface between a user program executed by the processor unit 1 and the JTAG command control unit 40.

Data that may be accessed via a cache memory by a cacheable instruction is maintained in a cache memory and is not always maintained in a physical memory. Accordingly, the cacheable instruction is not always suitable for an interface between a user program executed by the processor unit 1 and the JTAG command control unit 40.

In contrast, data that is accessed by a non-cache instruction is directly exchanged between the physical memory and a register or an I/O unit corresponding to a non-cache address. Accordingly, unlike a normal cacheable instruction, a non-cache instruction assures that data to be read or data written is always present in the physical memory in the address space. One type of the ASI command used in the second embodiment also has such an assurance. Note that one type of the ASI command refers to the ASI command determined as a command to be transferred to the L2 cache control unit 30 by the L2-ASI instruction detecting unit 21 of the L1 cache control unit 20.

However, particular addresses of the addresses of a non-cache space are assigned to existing registers or I/O units. Accordingly, the interface that delivers a JTAG command to the JTAG command control unit 40 needs to be designed so as not to use the addresses assigned to the existing devices. However, since a new ASI space is used, such a design is not needed for the ASI command of the second embodiment.

Two addresses, that is, the data patterns of "ASI_CMD_ACCESS_REG" and "ASI_CMD_RECEIVE_REG" may be additionally defined for a non-cache space. When a write operation to the two addresses is detected, the operation performed by the processing apparatus of the first embodiment may be started. Such a configuration and a procedure allow users to utilize a mechanism the same as that of the processing apparatus of the first embodiment even in a widely used CPU.

Figure 16:
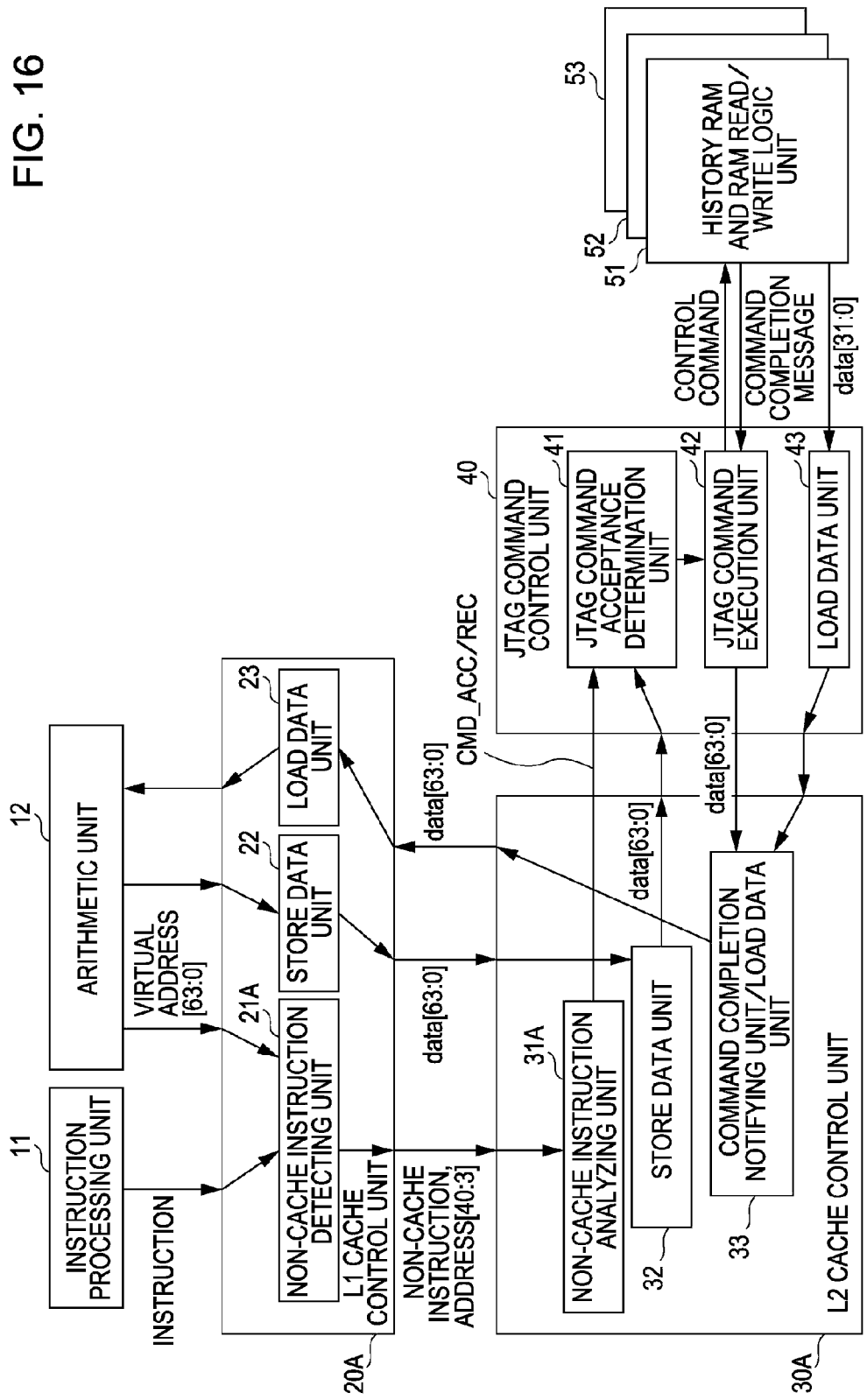
FIG. 16 illustrates a processing apparatus that employs access to a non-cache space.

FIG. 16 illustrates an exemplary configuration of a processing apparatus that employs access to a non-cache space. As illustrated in FIG. 16, the L2-ASI instruction detecting unit 21 illustrated in FIG. 5 that illustrates access to an ASI space is replaced with a non-cache instruction detecting unit 21A. The non-cache instruction detecting unit 21A of an L1 cache control unit 20A searches a TLB when converting a virtual address to a physical address. Upon detecting an access to a non-cache space, the non-cache instruction detecting unit 21A delivers, to an L2 cache control unit 30A, the instruction together with information indicating whether the instruction is "load" or "store" and information indicating that the instruction accesses a non-cache apace. In addition, even when the instruction processing unit 11 instructs a direct access to a non-cache space, the non-cache instruction detecting unit 21A of the L1 cache control unit 20A receives the instruction. The non-cache instruction detecting unit 21A then delivers, to the L2 cache control unit 30A, the instruction together with information indicating whether the instruction is "load" or "store" and information indicating that the instruction accesses a non-cache apace.

As illustrated in FIG. 5, the ASI instruction interpreting unit 31 of the L2 cache control unit 30 detects an access to the JTAG command control unit 40 using the ASI number and some of the address bits. In contrast, as illustrated in FIG. 16, the ASI number is not used, and all of the address bits are used. Two commands "ASI_CMD_ACCESS_REG" and "ASI_CMD_RECEIVE_REG" are defined as non-cache addresses. When an access to these addresses is detected, a non-cache instruction interpreting unit 31A delivers the JTAG command to the JTAG command control unit 40. That is, as illustrated in FIG. 16, the processing apparatus includes an interface that detects an access to the JTAG command control unit 40 using a non-cache instruction, not an ASI command. The other configuration and control illustrated in FIG. 16 are the same as those illustrated in FIG. 5 in which an ASI space is employed.

Modifications

In the second embodiment illustrated in FIG. 5, the L2-ASI instruction detecting unit 21 is provided in the processor unit 1. In addition, an ASI command detected by the L2-ASI instruction detecting unit 21 is written from the ASI instruction interpreting unit 31 of the L2 cache control unit 30 to a register of the JTAG command control unit 40. Furthermore, the operation log read by the JTAG command control unit 40 is delivered from the command completion notifying unit/load data unit 33 of the L2 cache control unit 30 to the processor unit 1. In this configuration, the input unit 2 and the output unit 3 of the first embodiment are included in the L2 cache control unit 30. This configuration is also applied to the configuration of the third embodiment illustrated in FIG. 16. However, it should be noted that the configuration of the processing apparatus is not limited thereto.

For example, the input unit 2 and the output unit 3 may be incorporated in the processor unit 1. For example, the L1 cache control unit 20 may include the ASI instruction interpreting unit 31. More specifically, a circuit block that identifies a register specified by the ASI space number and the least significant bits of a virtual address in the ASI space may be provided in the L1 cache control unit 20. The L1 cache control unit 20 may determine which one of the "ASI_CMD_ACCESS_REG" instruction and the "ASI_CMD_RECEIVE_REG" instruction is input. In order to allow the determination, at least one of the least significant bits of the virtual address may be specified.

In addition, the L1 cache control unit 20 may write the data pattern of a JTAG command to the JTAG command acceptance determination unit 41 provided in the JTAG command control unit 40 of the L2 cache control unit 30. In addition, the load data unit 43 of the JTAG command control unit 40 may deliver an operation log read from the history RAM to the load data unit 23 of the L1 cache control unit 20. In such a case, for example, a data transmission path may be provided in place of the L2 cache control unit 30. Such a configuration may be also applied to the configuration of the third embodiment illustrated in FIG. 16.

Fourth Embodiment

According to a fourth embodiment, an exemplary configuration in which the input unit 2 and the output unit 3 are included in the processor unit 1 is described. The other configuration and operations are the same as those of the first to third embodiments. Accordingly, the same numbering is used in describing the fourth embodiment as was utilized in the first to third embodiments, and the descriptions thereof are not repeated. In addition, the components of the configurations described in the first to third embodiments are applied to the configuration of the fourth embodiment where appropriate.

Figure 17:
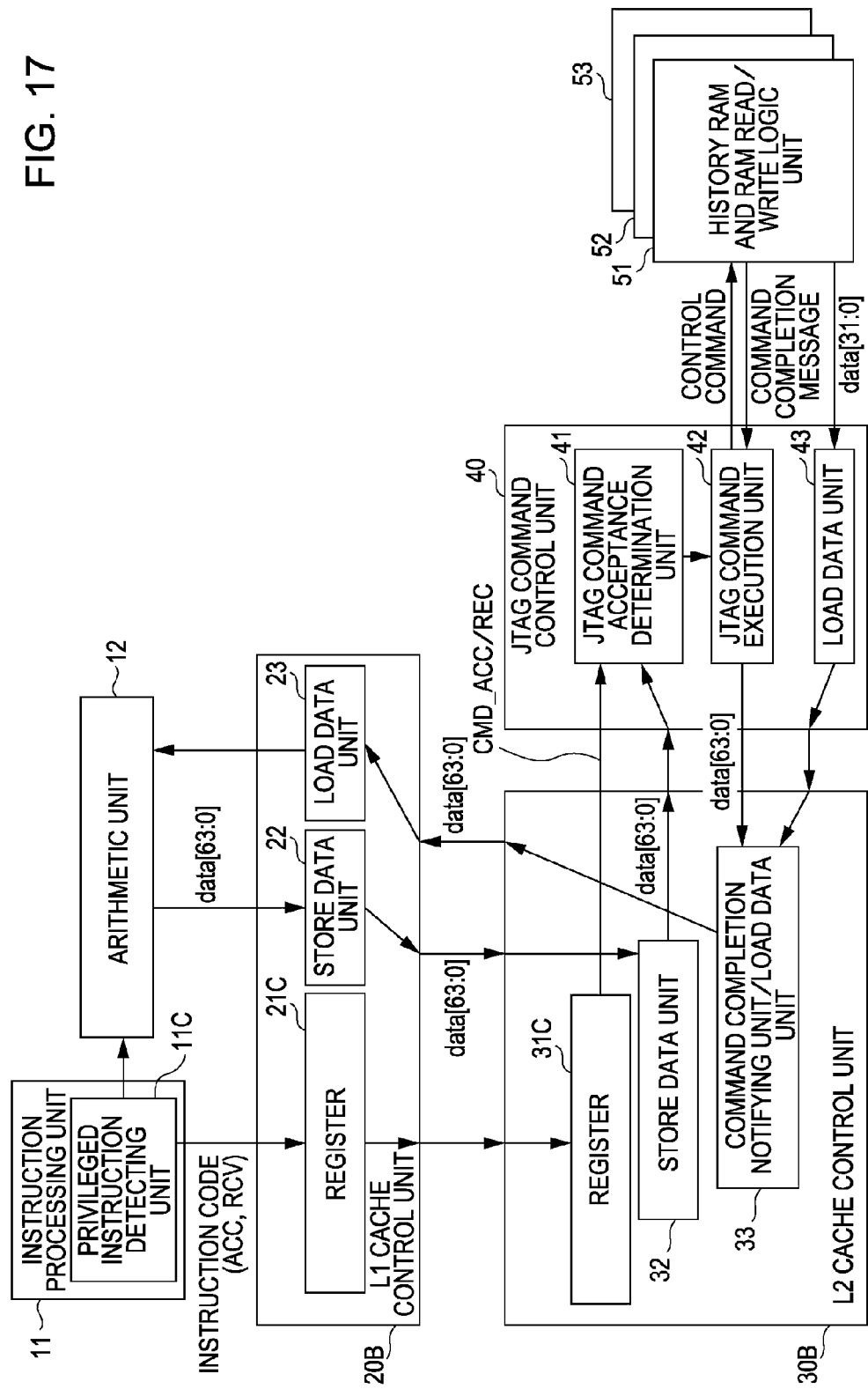
FIG. 17 illustrates a processing apparatus that performs control using privileged instructions.

According to the fourth embodiment, an interface with the JTAG command control unit 40 is additionally assigned to an instruction unit for referring to a privileged register. FIG. 17 illustrates an exemplary configuration of a processing apparatus that performs control similar to the processing of the first embodiment using privileged instructions. The privileged instructions include an instruction for controlling the mode of the processor unit 1, the execution state of a program, and an instruction for transferring data between an input/output device and the CPU or between the input/output device and a main memory.

According to the present embodiment, for example, a privileged instruction included in an existing instruction set of the processor unit 1 is used. The privileged instruction is defined as, for example, a privileged I/O instruction. Two bits used for identifying two commands "ASI_CMD_ACCESS_REG" and "ASI_CMD_RECEIVE_REG" (identification bits[0:1]) are defined in an unused field of the privileged instruction (a field in which the operand is directly specified). For example, "identification bits[0:1]='01'" indicates that the privileged I/O instruction specifies "ASI_CMD_ACCESS_REG". In addition, "identification bits[0:1]='10'" indicates that the privileged I/O instruction specifies "ASI_CMD_RECEIVE_REG".

Furthermore, a privileged instruction detecting unit 11C is provided in the instruction processing unit 11. The privileged instruction detecting unit 11C is a circuit block for detecting a privileged I/O instruction and the identification bits[0:1]. The privileged instruction detecting unit 11C of the instruction processing unit 11 includes an existing circuit block that detects a privileged I/O instruction and a circuit that detects the identification bits[0:1].

When a privileged instruction includes the identification bits[0:1], the privileged instruction detecting unit 11C detects the identification bits[0:1] and determines whether the bits indicate "ASI_CMD_ACCESS_REG" or "ASI_CMD_RECEIVE_REG". Thereafter, the privileged instruction detecting unit 11C writes the operation code of "ASI_CMD_ACCESS_REG" or "ASI_CMD_RECEIVE_REG" to a register 21C of the L1 cache control unit 20. In addition, at that time, the privileged instruction detecting unit 11C instructs the arithmetic unit 12 to write the data pattern to be delivered to the JTAG command control unit 40 in a store register of the store data unit 22. Accordingly, the processing apparatus generates the data pattern to be delivered to the JTAG command control unit 40 in the arithmetic unit 12 before the privileged instruction is executed.

When the operation code is written to the register 21C, an L1 cache control unit 20B directly writes the written operation code to a register 31C of an L2 cache control unit 30B. In addition, the store data unit 22 outputs the written data to the store data unit 32 of the L2 cache control unit 30B.

When the operation code is written, the L2 cache control unit 30B directly transfers the written operation code to the JTAG command acceptance determination unit 41 of the JTAG command control unit 40. In addition, at that time, the store data unit 32 transfers the written data to the JTAG command acceptance determination unit 41. The subsequent processing is the same as that of the first to third embodiments.

In order to perform such processing through a user program, a compiler prepares a data pattern to be delivered to the JTAG command control unit 40 in the arithmetic unit 12. Such a data pattern may be set in a memory as a constant and may be delivered to the arithmetic unit 12. Thereafter, the compiler may generate an instruction to invoke a system call that submits a privileged I/O instruction (a request to the OS) in the user program. Subsequently, the compiler may set the identification bits[0:1] in the operand (the unused field) of the privileged I/O instruction.

Widely used processing apparatuses, such as a CPU, provide a JTAG command. However, the processing apparatus that executes a user program cannot directly execute the JTAG command. Through the above-described method, a JTAG command may be used from a user program. In such a case, the JTAG commands fall into one of two categories: JTAG commands that are available to users or JTAG commands that are unavailable to users. Thus, only a limited set of the JTAG commands is available to users.

In the above-described configuration, the privileged instruction detecting unit 11C detects a privileged instruction and the identification bits[0:1] and outputs the data to the JTAG command control unit 40. Thus, the configuration is an example in which the input unit 2 and the output unit 3 of the first embodiment are included in the processor unit 1.

Alternatively, as a general method, a new operation code used for accessing a physical memory without using a cache may be added in the instruction set of the processor unit 1. In this way, an interface of this method may be formed by using the added instruction. That is, when the instruction processing unit 11 detects the new operation code, the data pattern of the JTAG command may be delivered to the L1 cache control unit 20, the L2 cache control unit 30, and the JTAG command control unit 40.

Fifth Embodiment

In the first to fourth embodiments, an exemplary interface through which a user program in the processing apparatus reads an operation log recorded in the history RAM via the JTAG command control unit 40 is described. According to the fifth embodiment, a user program to be monitored (hereinafter referred to as a "monitored program") and a monitoring program that generates an operation log while the monitored program is being executed are executed as parallel processes. In some cases, if a monitoring process is executed in parallel to the execution of a monitored program, the processing performed by the processing apparatus may be simplified. In addition, when an analyzed program that is distributed in a binary format is analyzed and if the monitoring program is executed in parallel to the execution of the analyzed program, any type of program may be monitored.

Figure 18:
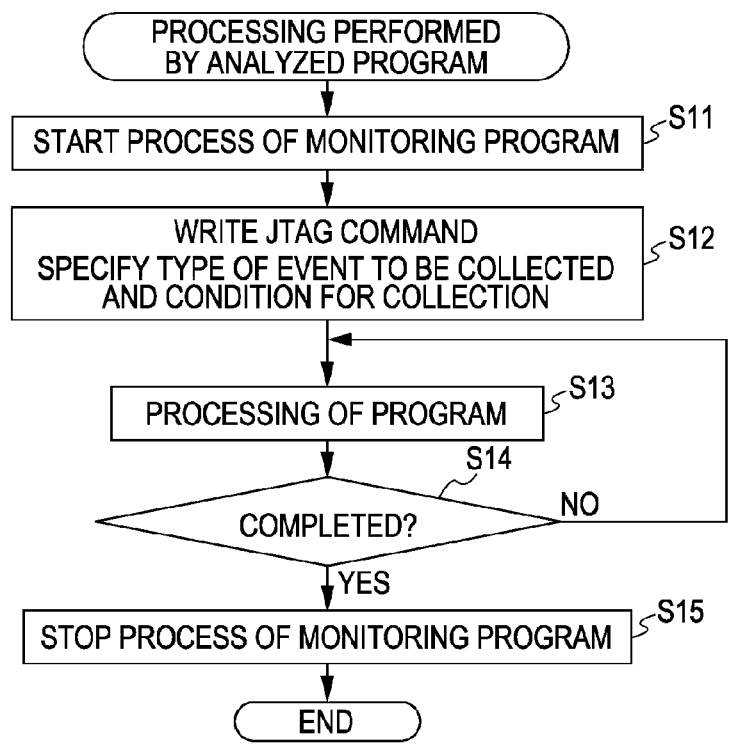
FIG. 18 is a flowchart illustrating a processing performed by a monitored program executed in the processing apparatus.

FIG. 18 is a flowchart illustrating exemplary processing performed by a monitored program executed in the processing apparatus. As illustrated in FIG. 18, the processing apparatus starts a process of the monitoring program (S11). The monitoring program is described in more detail below with reference to FIGS. 19 and 20. When the process of the monitoring program is started, the process of the monitoring program may be executed under an environment different from that of the program that has started the monitoring program. In the present embodiment, for example, the monitored program that starts the monitoring program is executed by a processor unit 1-1, while the started monitoring program is executed by a processor unit 1-2.

Subsequently, the processing apparatus writes a JTAG command using, for example, "ASI_CMD_ACCESS_REG" described in the second embodiment (S12). At that time, the processing apparatus specifies the type of collected event and the condition for collecting the event together with the JTAG command. Note that the JTAG command may be written using, for example, the interface described in the third and fourth embodiments. Thus, the JTAG command is delivered to the JTAG command control unit 40, and log information may be acquired. In FIG. 18, the error processing performed when a JTAG command write error occurs is not illustrated. However, in the processing performed in S12, an error processing procedure illustrated in FIGS. 7 and 8 may be executed.

Subsequently, the processing apparatus executes the program (S13). Here, the execution of the program is execution of an original application processing to be performed by the analyzed program. The processing apparatus determines whether to complete the processing of the program (S14). For example, when specific data processing or computation is completed or when the processing apparatus has received a completion command from a user via a user interface, the processing performed by the program is completed.

If the processing of the program is not completed, the processing performed by the processing apparatus returns to S13. However, if the processing of the program is completed, the processing apparatus stops the monitoring program (S15). For example, by sending a message to the monitoring program or using a shared memory, the analyzed program may notify the monitoring program of the completion. Thus, the execution of the analyzed program is completed.

Figure 19:
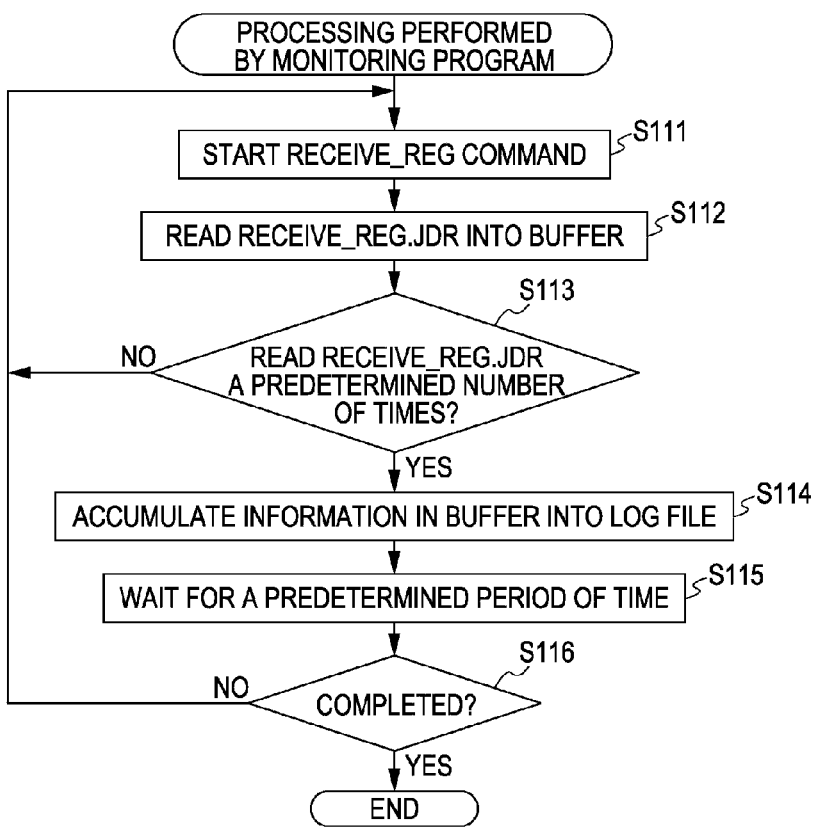
FIG. 19 illustrates a processing performed by a monitoring program.

FIG. 19 illustrates exemplary processing performed by the monitoring program. In this processing, the processor unit 1-2 to which the process of the monitoring program is assigned invokes an "ASI_CMD_RECEIVE_REG" command described in the second embodiment (S111). Note that, instead of the ASI-based command described in the second embodiment, a command using the interface described in the third and fourth embodiments may be invoked, for example.

The processing apparatus reads the JDR of the data pattern (event information recorded in the history RAM) and stores the read data in a buffer (S112). As used herein, the term "buffer" refers to, for example, a memory area that temporarily holds a specific number of 32-bit JDRs.

Subsequently, the processing apparatus determines whether the JDR is read from the buffer a specific number of times (S113). The reason why the processing apparatus determines whether the JDR is read from the buffer a specific number of times is that the data size of the JDR of the data pattern may be smaller than the capacity of the history RAM. For example, when the capacity of the history RAM is 1 KB (=32 bit×1024), the processing apparatus reads the buffer via the JDR (32 bits) of the data pattern 1024 times. Accordingly, if the processing apparatus has not yet read the JDR from the buffer the specific number of times, the processing performed by the processing apparatus returns to S111. In this manner, the processing apparatus repeats a reading process of the next data item from the history RAM via the JTAG command control unit 40.

However, if the JDR has been read from the buffer the specific number of times, the processing apparatus accumulates the information in the buffer, that is, the event information recorded in the history RAM in a log file (S114). For example, a file stored in the incorporated external storage unit 203 illustrated in FIG. 15 serves as the log file. As used herein, the term "accumulating" refers to appending the information to the log file. Note that when executing an analyzing program, the processing apparatus may further combine the log file generated in S114 with the previously generated log file (refer to S4 illustrated in FIG. 14).

Subsequently, the processing apparatus waits for a specific period of time (S115). For example, the specific period of time may be set in the processing apparatus by the user via a user interface. After the specific period of time has elapsed, the processing apparatus determines whether to complete the process (S116). For example, completion of the process is notified by a message sent from the monitored program or an instruction stored in a shared memory. If the process is not completed, the processing performed by the processing apparatus returns to S111. In this way, the processing apparatus repeatedly reads the recorded operation log at specific time intervals until the processing apparatus receives an instruction to stop the processing from the monitored program.

However, if the processing apparatus receives an instruction to stop the processing from the monitored program, the process of the monitoring program is completed.

The specific period of time may be zero. In such a case, the processing apparatus performs the processing from S111 through S116 without a wait time. However, even when the wait time is zero, the processing time performs the processing from S111 through S115.

As described above, according to the present embodiment, the processing apparatus intermittently collects the event information recorded in the history RAM from the JTAG command control unit 40 via the interface described in the first to fourth embodiments at specific time intervals and accumulates the event information in a specific log file. While executing the monitored program illustrated in FIG. 18, the processing apparatus instructs the JTAG command control unit 40 to record an operation log in the history RAM. In addition, the processing apparatus may execute the monitoring program in parallel with execution of the monitored program and read the operation log at specific time intervals.

Figure 20:
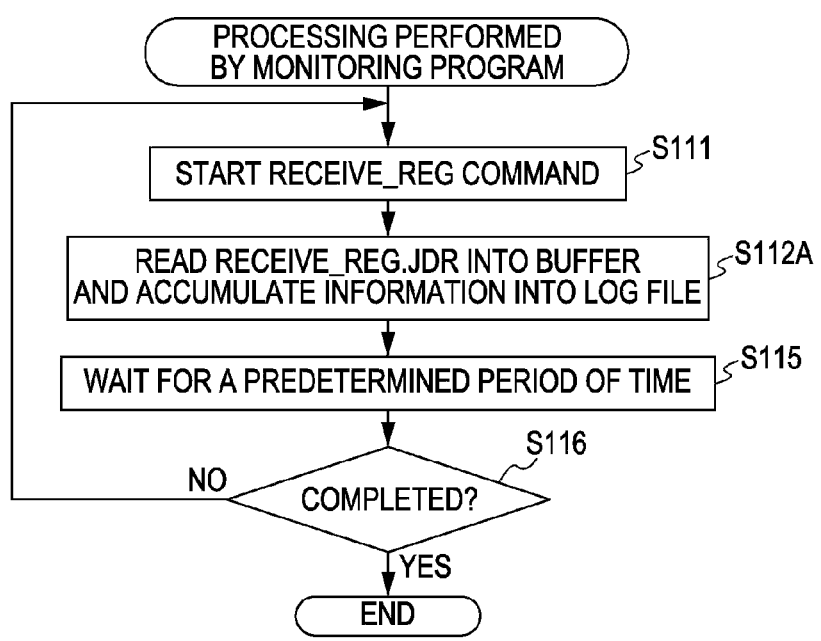
FIG. 20 illustrates another processing performed by the monitoring program.

FIG. 20 illustrates other exemplary processing performed by the monitoring program. In particular, FIG. 20 illustrates exemplary processing performed by the monitoring program when the capacity of the history RAM is insufficient (e.g., when the history RAM has a capacity for recording only one event information item). In the processing illustrated in FIG. 20, S112 to S114 illustrated in FIG. 19 are replaced with S112A. That is, when the capacity of the history RAM is limited to the capacity required for recording one event information item, the operation log in the history RAM may be read through one read operation using the JDR of the data pattern. In such a case, the processing apparatus may directly accumulate the read operation log in the log file (S112A). Thereafter, the processing apparatus waits for a specific period of time (S115), and the processing returns to S111. Subsequently, the processing the same as that in FIG. 19 may be repeated.

By using such processing performed by the monitoring program, even a processing apparatus that does not have a history RAM and includes a unit that records a single event may provide an analyzing function. That is, according to the processing performed by the monitoring program illustrated in FIG. 20, the JTAG command control unit 40 may include only a unit that records and reads at least one event. Since the monitoring program may accumulate the log in a log file, an analyzing function equivalent to the analyzing function of a processing apparatus having a sufficient capacity of the history RAM may be provided. By statistically processing a log file in which one event is accumulated for a long time, analysis that is substantially the same as the analysis obtained by processing a log file in which a plurality of events acquired in a short time are recorded may be provided.

If the processing apparatus includes a unit that records and reads at least one event, performance analyzing may be performed. In such a case, it is only required that, in the processing performed by the monitoring program illustrated in FIG. 20, the JTAG command control unit 40 holds the event for a period of time required for the processing in S111 to S112A. Note that if a plurality of events to be collected occurs during the period of time for the processing in S111 to S112A, the latest event information is delivered from the JTAG command control unit 40 to the monitoring program.

Other Modifications

A variety of other methods for determining the timing at which a variety of types of log information are collected, analyzing the log information, and feeding back the analysis in order to improve the performance have been developed. However, in any method, by, as described above, selecting and collecting the appropriate type of log information and analyzing the collected log information using a variety of techniques, the performance of the analyzed program may be improved.

The processing apparatus selects some of the JTAG commands and allows users to use the selected JTAG commands. Accordingly, the users of the processing apparatus may safely use the functions of the JTAG commands. However, in order to provide, to the users, the functions of the JTAG commands that has heretofore been unavailable to the users, such functions may be invoked via an OS. Although such functions are not available to general users, the functions may be available for system administrators. In this way, for example, the user may start and stop the clock of a CPU using a clock control mechanism provided by a JTAG command through an OS or change the operating frequency of the clock. In addition, by using a cache memory capacity changing function of a JTAG command, the user may change the cache capacity through an OS in order to save the power.

In addition, an operation mode in which more JTAG commands implemented in the processing apparatus may be made available for the users may be provided. In such an operation mode, when the user verifies the design of a CPU in an actual operating environment, the user may associate a JTAG command with any point in a program. In this way, a debug function for the designers may be expanded.

Alternatively, for example, the configuration may be applied to analysis performed when the execution order of the instructions of a program is changed for optimization by a compiler. In particular, in order to perform an out-of-order execution, the hardware changes the execution order of the instructions that was changed by the compiler again. Accordingly, it is difficult for a programmer, a developer of a compiler, and/or a developer of hardware to recognize whether the processing apparatus operates as intended. That is, in existing configurations, it is verified only whether the expected performance is obtained or not in order to determine whether tuning may work or not. Therefore, if the user encounters unexpected degradation of the performance, it is difficult for the user to sufficiently analyze the problem and find the cause.

However, by using the JTAG command execution function described in the above-described embodiments, an analyzing function that may be employed when the user encounters unexpected degradation of the performance may be provided.

What is claimed is:

1. A processing apparatus, comprising:
    a memory
    a first processor that is coupled to the memory and executes a first procedure including:
        executing a program including a plurality of instructions;
        issuing a first command, complying with a first command system, by executing the program upon detecting a second command, complying with a second command system different from the first command system, for starting a process to issue the first command;
        recording an operation log about an operation corresponding to the plurality of instructions in the memory in response to the first command; and
    a second processor that is coupled to the memory and executes a second procedure including issuing a third command complying with the first command system to instruct recording the operation log about the operation corresponding to the plurality of instructions in the memory, wherein, when both the first command and the third command are issued, the third command is executed on a priority basis, a notification for notifying of non-executing of the first command is issued, and the first processor reissues the first command.

2. The processing apparatus according to claim 1, wherein the first procedure executed by said first processor further includes specifying a type of operation to be recorded in the operation log and a recording condition for recording an operation in the operation log; and controlling the recording in accordance with the type of operation specified if the recording condition is satisfied.

3. The processing apparatus according to claim 2, wherein the recording condition includes specification of one of the instructions in the program and indicates that starting of recording or stopping of recording is activated when the first processor executes the one of the instructions.

4. The processing apparatus according to claim 1, wherein the first procedure executed by said first processor further includes counting a number of detections of cache misses occurring at an address of a memory at which an instruction in the executed program or data specified by the instruction is stored for each index address used when the instruction or the data is registered in a cache.

5. The processing apparatus according to claim 1, wherein the recording includes sequentially recording the operation log and setting identification information indicating a recording start point when recording of the operation log is started, and recording a new operation log from the head of the recording area after recording the operation log at the end of the recording area of the log recording unit, the end of the recording area representing a limit of recording capacity of the recording area.

6. The processing apparatus according to claim 1, wherein the procedure executed by said first processor further includes acquiring an operation log at a plurality of points of time after the first processor starts executing the program;

combining the operation logs acquired at the plurality of points of time; and storing the combined operation logs in a single file.

7. The processing apparatus according to claim 1, wherein an address space in which the first processor accesses an instruction and the data specified by the instruction includes a first address space and at least one second address space, and wherein the first address space contains the second command, the first command and the data specified by the first command, and the second address space contains an instruction other than the second command and data specified by the instructions other than the second command.

8. The processing apparatus according to claim 1, wherein the first command system is a set of joint test action group commands and the second command system is a set of address space identifier commands.

9. A method for acquiring a log for use in a processing apparatus including first and second processors coupled to a memory, the first processor executing a program that includes a plurality of instructions, the method comprising:

issuing a first command, complying with a first command system, by executing the program upon detecting a second command, complying with a second command system different from the first command system, for starting a process to issue the first command;

recording an operation log about an operation corresponding to the plurality of instructions in the memory in response to the first command;

executing a second procedure in the second processor including issuing a third command complying with the first command system to instruct recording the operation log about the operation corresponding to the plurality of instructions in the memory; and when both the first command and the third command are issued, executing the third command on a priority basis;

issuing a notification for notifying of non-executing of the first command; and reissuing the first command by the first processor.

10. The method according to claim 9, wherein the first command system is a set of joint test action group commands and the second command system is a set of address space identifier commands.

* * * * *